United States Patent [19]

Hayakawa et al.

[11] Patent Number: 4,726,262
[45] Date of Patent: Feb. 23, 1988

[54] AUTOMATIC TRANSMISSION WITH OVERDRIVE INHIBITOR

[75] Inventors: Yoichi Hayakawa, Toyoake; Kaiya Fujiura, Nishio; Kazuaki Watanabe; Yoshiharu Harada, both of Toyota, all of Japan

[73] Assignee: Aisin Warner Limited, Japan

[21] Appl. No.: 773,428

[22] Filed: Sep. 6, 1985

[30] Foreign Application Priority Data

Sep. 10, 1984 [JP] Japan .................. 59-190401

[51] Int. Cl.⁴ .................................. B60K 41/06
[52] U.S. Cl. ................................ 74/866; 74/740; 74/878; 180/247
[58] Field of Search ........... 180/247, 248, 249, 250; 74/740, 745, 878, 866, 665 T, 861

[56] References Cited

U.S. PATENT DOCUMENTS

| | | | |
|---|---|---|---|
| 3,939,722 | 2/1976 | Stromberg | 74/861 X |
| 3,939,733 | 2/1976 | Wetrich | 74/740 |
| 4,312,248 | 1/1982 | Sugimoto et al. | 74/866 X |
| 4,325,450 | 4/1982 | Ward | 74/745 X |
| 4,373,409 | 2/1983 | Benedek et al. | 74/745 |
| 4,503,927 | 3/1985 | Hayakawa et al. | 74/752 A X |

FOREIGN PATENT DOCUMENTS

| | | | |
|---|---|---|---|
| 4293 | 1/1980 | Japan | 180/247 |
| 113851 | 9/1981 | Japan | 74/745 |
| 2065244 | 6/1981 | United Kingdom | 180/247 |
| 2148420 | 5/1985 | United Kingdom | 74/745 |

Primary Examiner—Leslie Braun
Assistant Examiner—Dwight Diehl
Attorney, Agent, or Firm—Steele, Gould & Fried

[57] ABSTRACT

An automatic transmission for motorcar of the type including a main transmission and an auxiliary transmission is disclosed. The auxiliary transmission has a plurality of speed changing stages and when it assumes a certain lower speed stage, any speed changing to higher speed stage is inhibited in the main transmission. The main transmission is provided with a solenoid valve which makes it possible to carry out speed changing to higher speed stage when it is turned on, while the auxiliary transmission is provided with a hydraulic control device which is communicated with a hydraulic servo via a hydraulic passage. The hydraulic servo is operatively associated with a speed reduction frictional engagement element which allows the auxiliary transmission to assume a certain lower speed stage. The solenoid valve is electrically connected to a pressure switch which is so constructed that it is turned off when the hydraulic servo is supplied with hydraulic oil and it is turned off when hydraulic pressure is released from the hydraulic servo. When the auxiliary transmission assumes a certain lower speed stage, the hydraulic servo is supplied with hydraulic oil and the solenoid valve is turned off. Thus, any speed changing to higher speed stage is inhibited in the main transmission.

16 Claims, 14 Drawing Figures

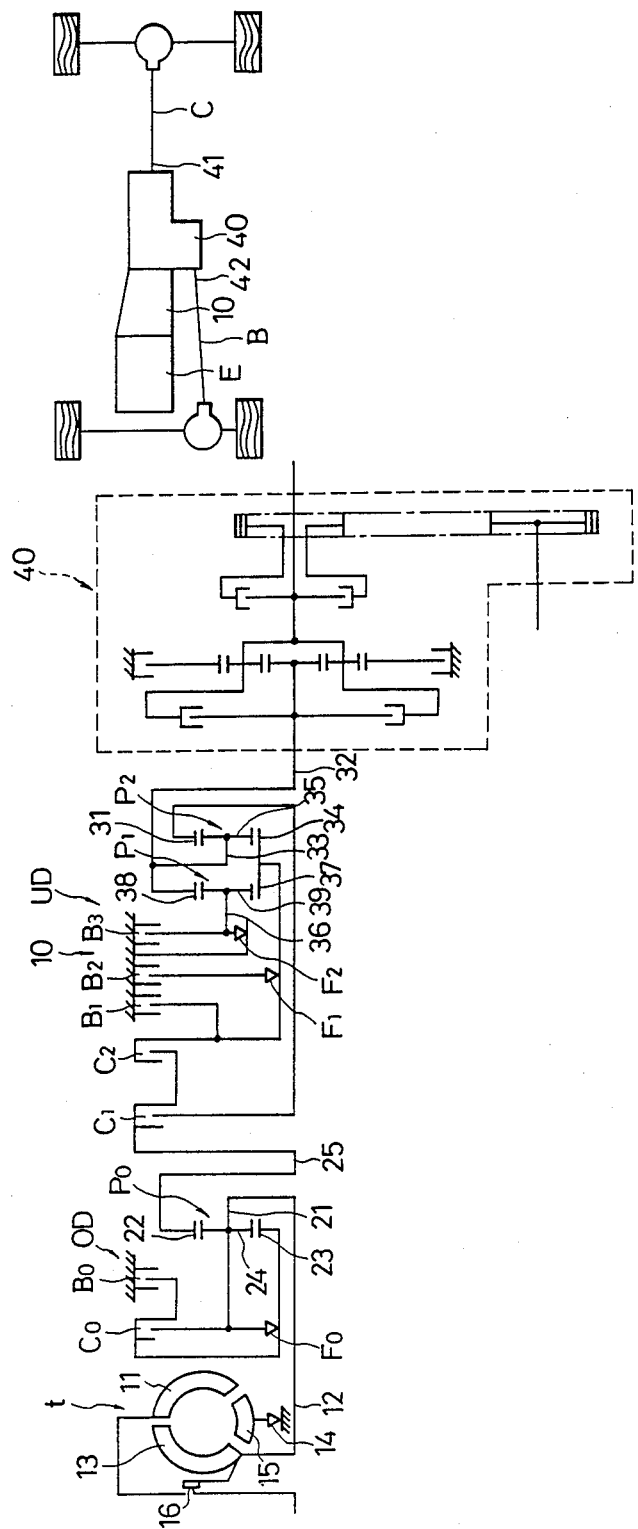

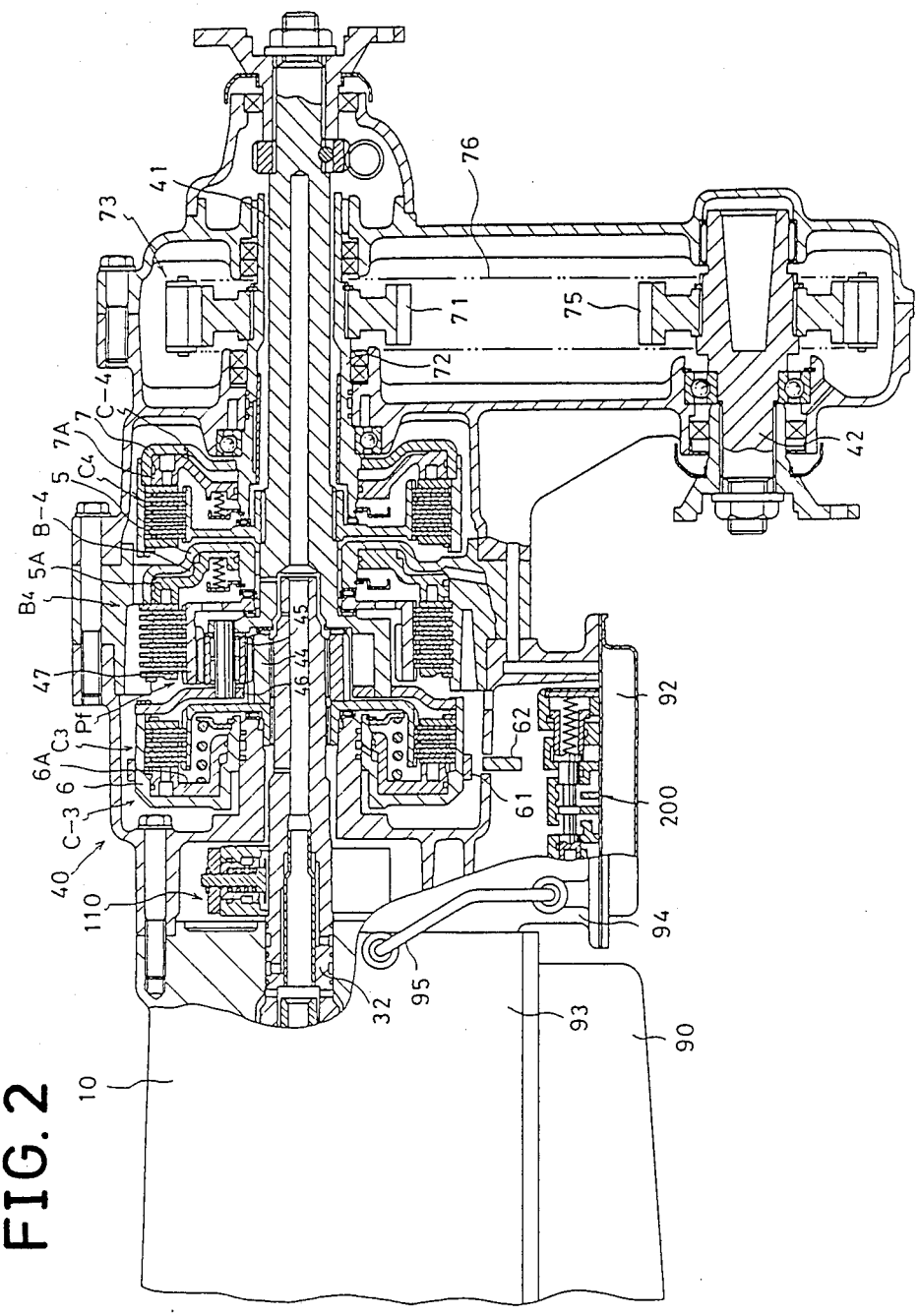

AUTOMATIC TRANSMISSION WITH OVERDRIVE INHIBITOR

BACKGROUND OF THE INVENTION

1. Field of the Invention

The present invention relates to an automatic transmission for a vehicle, particularly, for a motorcar of the type including a main transmission and an auxiliary transmission.

2. Description of the Prior Art

A hitherto known four wheel driving automatic transmission of the type including a main transmission and an auxiliary transmission has a four wheel driving transfer attached thereto which is so constructed that speed changing such as two wheel driving in the directly connected state (H2), four wheel driving in the directly connected state (H4), four wheel driving in the speed reduced state (L4) or the like is controlled by selectively actuating a manual shift. The four wheel driving vehicle with the above-described four wheel driving automatic transmission mounted thereon usually uses L4 having a high gear torque on a steeply inclined road, rugged ground or the like under severe running conditions.

However, it has been found that the conventional automatic transmission as constructed in the above-described manner fails to effectively function when it assumes the low gear torque range at a time when the high speed range (overdrive) is also selected or operating. Further, when overdrive and the L4 range are simultaneously engaged, the planetary gears used for overdrive are caused to rotate at a high rotational speed. This has a substantial detrimental effect on the operational life of gears and associated components in the transmission.

SUMMARY OF THE INVENTION

Hence, the present invention has been made with the foregoing background in mind and its object resides in providing an automatic transmission usable for a vehicle, particularly for a motorcar, which assures that the main transmission is inhibited from an occurrence of speed changing to overdrive stage when the vehicle runs on the road, ground or the like having a high resistance against running while the auxiliary transmission is held at lower speed stage and moreover assures improved durability of the planetary gear mechanism employable for the purpose of overdrive.

To accomplish the above object there is proposed according to the present invention an automatic transmission for a vehicle, particularly for a motorcar of the type including a main transmission and an auxiliary transmission with a plurality of speed changing stages incorporated therein, which is characterized in that speed changing to a higher speed stage is inhibited in the main transmission when the auxiliary transmission assumes a certain lower speed stage.

In a preferred embodiment of the invention the main transmission is provided with a solenoid valve which makes it possible to carry out speed changing to a certain higher speed stage in the main transmission when it is turned on and the auxiliary transmission is provided with a hydraulic control device which communicates with a hydraulic servo for a speed reduction engagement element via a speed reduction hydraulic passage so as to allow the auxiliary transmission to assume a certain lower speed stage. The solenoid valve is disposed midway of the speed reduction hydraulic passage and it is electrically connected to a pressure switch which is so constructed that it is turned off when the hydraulic servo is supplied with hydraulic oil and it is turned on when hydraulic pressure is released from the hydraulic servo. When the auxiliary transmission assumes a certain lower speed stage, the hydraulic servo is supplied with hydraulic oil and the solenoid valve is turned off so that speed changing to the higher speed stage is inhibited in the main transmission.

When the auxiliary transmission assumes a certain lower speed stage, speed changing to higher speed stage (for example, overdrive) is inhibited in the main transmission without any rotation of planetary gears for the purpose of overdrive at a higher rotational speed, resulting in improved durability of the planetary gears for overdrive being assured.

Other objects, features and advantages of the invention will become more clearly apparent from the following description which has been prepared with reference to the accompanying drawings.

BRIEF DESCRIPTION OF THE DRAWINGS

The accompanying drawings will be briefly described below.

FIG. 1 is a skeleton figure schematically illustrating a combination of conventional four wheel driving automatic transmission with overdrive included therein and four wheel driving transfer in accordance with the first embodiment of the invention.

FIG. 2 is a vertical sectional view of the four wheel driving transmission as schematically illustrated in FIG. 1.

FIG. 3 is a schematic plan view of a motorcar particularly illustrating the power transmitting system in the motorcar.

DETAILED DESCRIPTION OF THE PREFERRED EMBODIMENTS

Figure 4:
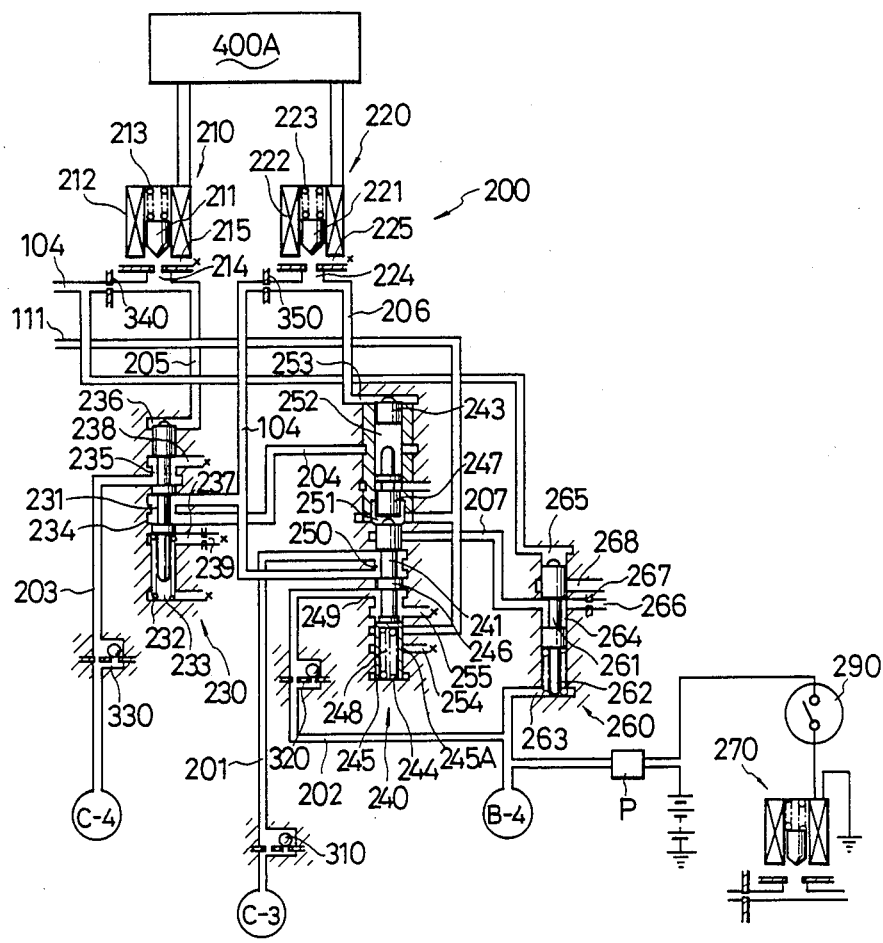
FIG. 4 is a hydraulic circuit diagram of a hydraulic control device for the four wheel driving transfer in accordance with the first embodiment of the invention.

The invention will now be described in detail with reference to the accompanying drawings which illustrate preferred embodiments thereof.

FIGS. 1 to 4 illustrate an automatic transmission for a motorcar in accordance with the first embodiment of the invention. FIG. 1 schematically illustrates a gear train for the automatic transmission for four wheel driving and FIG. 3 is a schematic plan view illustrating a four wheel driving motorcar.

The automatic transmission 10 for generating four speeds includes a hydraulic torque converter t, an overdrive mechanism OD and an underdrive mechanism UD comprising three stages for forward movement and one stage for rearward movement.

The torque converter t comprises a pump 11 operatively connected to an output shaft of the engine, a turbine 13 operatively connected to an output shaft of the torque converter t, a stator operatively connected to the fixed portion via a one-way clutch 14 and a directly connected clutch 16, wherein the output shaft 12 of the torque converter t serves as an input shaft of the overdrive mechanism OD.

Specifically, the overdrive mechanism OD essentially comprises a group including multiplate clutch Co, multiplate brake Bo and one-way clutch Fo, each of which serves as a frictional engaging element, and a planetary gear set Po, components of which are fixedly secured to the fixed portion, such as the transmission case or the like, or are operatively connected to an input shaft, output shaft or other component or are released from the fixedly secured state or the operatively connected state by selective engagement of the frictional engaging element. Incidentally, the output shaft 12 of the torque converter t serves as input shaft (12) of the overdrive mechanism OD.

The planetary gear set Po comprises a carrier 21 operatively connected to the input shaft 12, a ring gear 22 operatively connected to the output shaft 25 of the overdrive mechanism OD, a sun gear 23 rotatably fitted on the input shaft 12 but fixedly secured to the transmission case via the brake Bo, the sun gear 23 being operatively connected to the carrier 21 via clutch Co and one-way clutch Fo which is arranged in parallel with the clutch Co, and a planetary pinion 24 rotatably supported by the carrier 21 to mesh with both the sun gear 23 and the ring gear 22.

The output shaft 25 of the overdrive mechanism OD serves also as the input shaft of the underdrive mechanism UD comprising three stages for forward movement and one stage for rearward movement.

The underdrive mechanism UD comprises multiplate clutches C1 and C2, multiplate brakes B1, B2 and B3, one-way clutches F1 and F2, a planetary gear set P1 at the fore stage and a planetary gear set P2 at the rear stage.

Specifically, the rear stage planetary gear set P2 comprises a ring gear 31 operatively connected to the input shaft 25 via clutch C1, a carrier 33 operatively connected to the output shaft 32 of the underdrive mechanism UD, a sun gear 34 operatively connected to the input shaft 25 via clutch C2 but fixedly secured to the transmission case via brake B1, brake B2 arranged in parallel with the brake B2, and a planetary pinion 35 meshing with the ring gear 31.

The automatic transmission 10 for generating four speeds is so constructed that selective engagement or disengagement is achieved for each of clutches and brakes serving as a frictional engagement element in dependence on running conditions of a motorcar such as opening of engine throttle, running speed or the like by actuating a hydraulic control device (not shown). Moreover, automatic speed changing is effected by way of four stages inclusive of overdrive (O/D) for forward movement while manual speed changing is effected merely by way of one stage for rearward movement.

A shift lever (not shown) disposed in an operator's seat for actuating a manual valve in the hydraulic control device includes shift positions SP for each of ranges comprising P (parking), R (reverse), N (neutral), D (drive), S (second) and L (low). Operative relation among shift positions SP, fourth speed (4), third speed (3), second speed (2) and first speed (1) in the speed changing stages as well as clutches and brakes is as shown on Table 1.

Referring to Table 1, reference letter "o" designates engagement of frictional components, reference letter "x" designates disengagement of the frictional components, reference letter "F" (free) designates free rotation of one-way clutch and reference letter "L" designates engagement of one-way clutch.

TABLE 1

| SP | | clutch | | | brake | | | | OWC | | |
|----|---|----|----|----|----|----|----|----|----|----|----|
|    |   | C0 | C1 | C2 | B0 | B1 | B2 | B3 | F0 | F1 | F2 |
| P  |   | o  | x  | x  | x  | x  | x  | x  |    |    |    |
| R  |   | o  | x  | o  | x  | x  | x  | o  | L  | F  | F  |
| N  |   | o  | x  | x  | x  | x  | x  | x  |    |    |    |
| D  | 1 | o  | o  | x  | x  | x  | x  | x  | L  | F  | L  |
|    | 2 | o  | o  | x  | x  | x  | o  | x  | L  | L  | F  |
|    | 3 | o  | o  | o  | x  | x  | o  | x  | L  | F  | F  |
|    | 4 | x  | o  | o  | o  | x  | o  | x  | F  | F  | F  |
| S  | 1 | o  | o  | x  | x  | x  | x  | x  | L  | F  | L  |
|    | 2 | o  | o  | x  | x  | o  | o  | x  | L  | L  | F  |
|    | 3 | o  | o  | o  | x  | x  | o  | x  | L  | F  | F  |
| L  | 1 | o  | o  | x  | x  | x  | x  | o  | L  | F  | L  |
|    | 2 | o  | o  | x  | x  | o  | o  | x  | L  | L  | F  |

FIG. 3 schematically illustrates by way of plan view a transfer 40 for four wheel driving usable for an automatic transmission for four wheel driving.

In FIG. 2 reference letters Pf designate a planetary gear set for the transfer 40. The planetary gear set Pf essentially comprises a sun gear 44 spline fitted to the rear part of an input shaft 32, a planetary pinion 45 meshing with the sun gear 44, a ring gear 47 meshing with the planetary pinion 45 and a carrier 46 on which the planetary pinion 45 is rotatably held and which is operatively connected to the foremost end of the first output shaft 41 in the transfer 40. Reference letter B4 designates a frictional brake for bringing the ring gear 47 into engagement with the transfer case 94 and reference letter B-4 designates a hydraulic servo for the brake B4 constituted by a combination of cylinder 5 formed in the transfer case 94 and piston 5A fitted into the cylinder 5. Further, reference letter C3 designates a frictional clutch adapted to be actuated by means of a hydraulic servo C-3 which is constituted by a combination of cylinder 6 operatively connected to the carrier 46 and a piston 6A fitted into the cylinder 6. The frictional clutch C3 is disposed on the gear transmission side of the planetary gear set Pf so as to establish and interrupt operative connection between the sun gear 44 and the carrier 46. Reference letter C4 designates a frictional clutch for establishing and interrupting operative connection between the first output shaft 41 operatively connected to the carrier 46 and the sleeve 72 operatively connected to the one sprocket 71 in the link mechanism for driving the other output shaft of the transfer 40 as will be described later and reference letter C-4 designates a hydraulic servo constituted by a combination of cylinder 7 welded to the sleeve 72 rotatably held in the transfer case 94 and piston 7A fitted into the cylinder 7. Reference numeral 42 designates a second output shaft of the transfer disposed in parallel with the first output shaft 41 and reference numeral 73 designates a link mechanism which comprises a sprocket 71 spline fitted onto the sleeve 72, a sprocket 75 spline fitted onto the second output shaft 42 and an endless chain 76 running between sprockets 71 and 75.

A parking gear 61 is disposed around the outer periphery of the cylinder 6 in the frictional clutch C3, whereby a ratchet 62 is brought in engagement with the parking gear 61 to immovably hold the first output shaft 41 when the shift lever in the automatic transmission is selectively shifted to the parking position.

Reference numeral 110 designates a governor valve fixedly mounted on the input shaft 32, reference numeral 90 designates an oil pan in the automatic transmission, reference numeral 200 designates an hydraulic control device adapted to control supply and discharge of hydraulic oil for each of clutches C3 and C4, brake B4, hydraulic servos C-3, C-4 and reference numeral 92 designates an oil pan for the hydraulic control device 200. Pressurized hydraulic oil to be supplied to the hydraulic servos C-3, C-4 and B-4 for the clutches C3 and C4 and the brake B-4 is introduced into the hydraulic control device 200 from the oil pan 90 via a pipe 95 extending between the case 93 of the four speed automatic transmission 10 and the transfer case 94.

As illustrated in FIG. 3, the transfer 40 is attached to the four speed automatic transmission 10 which in turn is fixedly secured to the engine E for a motorcar in such a manner that the first output shaft 41 is operatively connected to propeller shaft C for driving the rear wheels and the second output shaft 42, constituting the other output shaft, is operatively connected to propeller shaft B for driving the front wheels. While a motorcar runs at a normal speed, line pressure is transmitted from the hydraulic control device for the four speed automatic transmission 10 to the hydraulic servo C-3 whereby the clutch C3 is brought in the engaged state and the brake B4 and the clutch C4 are released from the engaged state with hydraulic pressure in the hydraulic servos B-4 and C-4 being discharged. This causes the sun gear 44 of the planetary gear set Pf to be operatively connected to the carrier 46 whereby rotational force is transmitted from the input shaft 32 to the first output shaft 41 at a speed reduction ratio of 1 so as to rotationally drive the two rear wheels. At this moment rotational force from the input shaft 32 is transmitted to the first output shaft 41 from the carrier 46 not via a combination of sun gear 44, ring gear 47 and carrier 46, but via the clutch C3 with no load exerted on each of gear teeth, resulting in elongated running life of the teeth being assured. When four wheel driving is required, the motorcar otherwise operating with two wheel driving, manual shifting is initiated by means of a switching lever or like switching means disposed in the operator's seat which activates the hydraulic control device 200 in the transfer 40. When the clutch C4 is smoothly brought in the engaged state as the hydraulic servo C-4 is gradually loaded with hydraulic pressure at a speed reduction ratio of 1, the first output shaft 41 is operatively connected to the sleeve 72 whereby rotational force is transmitted also to the front wheels by means of the link mechanism 73, the second output shaft 42 and the propeller shaft B for rotationally driving the front wheels. As a result, four wheel driving is achieved with the use of rotational force which is transmitted from the input shaft 32 to both the first and second output shafts 41 and 42. When it becomes necessary to increase output torque while a motorcar runs on a steeply inclined road or the like with the use of four wheel driving, hydraulic pressure introduced into the hydraulic servo is transmitted to inhibitor valve 240 and down-shift timing valve 260 to actuate valves 240 and 260, whereby the hydraulic servo B-4 is gradually loaded with hydraulic pressure and the hydraulic servo C-3 is released from the effect of hydraulic pressure in the properly determined timing relation, with the result that the brake B4 is gradually brought in the engaged state and the clutch 3 is smoothly released from the operative state. Thus, the sun gear 44 and the carrier 46 are operatively disconnected from one another and the ring gear 47 is immovably held, whereby rotational force is transmitted from the input shaft 32 to both the first and second input shafts 41 and 42 at a reduced rotational speed via the sun gear 44, the planetary pinion 45 and the carrier 46, resulting in a four wheel driving state being established with high torque. Table 2 shows a relation among the preset range of manual shifting for the transfer, operative engagement and disengagement of brake B4 and clutches C3 and C4 and the running state of a motorcar.

TABLE 2

| present range of manual shifting | running state | frictional engagement component | | | example of speed reduction ratio |
|---|---|---|---|---|---|
| H2 | H2 | x | o | x | 1 |
| H4 | H4 | x | o | o | 1 |
| L4 | H4 | x | o | o | 1 |
|    | L4 | o | x | o | 3.0 |

In Table 2 mark "o" designates the operative state where frictional engagement component is brought in engagement and mark "x" designates the operative state where the component is released from engagement. The symbol "λ" designates a speed reduction ratio and represents a ratio of number of teeth of the sun gear 44 to that of the ring gear 47 in the planetary gear set Pf. When calculation is made on the assumption that is 0.5, the speed reduction ratio equals 3.0 in accordance with calculation formula:

$$(1+\lambda)/\lambda = 3.0.$$

Next, the hydraulic control device in the four wheel driving transfer according to the first embodiment of the invention will be described with reference to FIG. 4.

Specifically, the hydraulic control device 200 in the transfer 40 comprises: a first solenoid valve 210; a second solenoid valve 220; a switching valve 230 for supplying and discharging hydraulic line pressure as working pressure for engagement and disengagement of four wheel driving; a switching valve for switching a higher level of engagement pressure for direct operative connection to a lower level of engagement pressure for speed reduction and vice versa, that is, an inhibitor valve 240 in the illustrated embodiment; a down-shift timing valve 260 disposed in an hydraulic oil discharging passage 207 through which hydraulic engagement pressure for making direct connection is transmitted via the inhibitor valve 240; and, a variety of hydraulic passages by way of which the above-mentioned valves and the hydraulic servos B-4, C-3 and C-4 hydraulically communicate with one another. Hydraulic passage 201 establishes hydraulic communication with the hydraulic servo C-3 for a frictional engagement component for making direct connection, that is, multiplate clutch C3. Hydraulic passage 202 establishes hydraulic communication with the hydraulic servo B-4 for a frictional engagement component for speed reduction, that is, multiplate brake B4. Hydraulic passage 203 establishes hydraulic communication with the hydraulic servo C-4 for a frictional engagement component for four wheel driving, that is, multiplate clutch C4. Hydraulic line pressure passage 104 communicates with passage 205 through orifice 340. Hydraulic passage 111 transmits hydraulic pressure for the governor. Hydraulic passage 204 establishes communication of hydraulic line pressure with a predetermined chamber in the inhibitor valve 240 via the switching valve 230. Hydraulic pressure in the first solenoid valve is transmitted by hydraulic passage 205 via hydraulic line pressure passage is and orifices 340 and 350. Hydraulic pressure in the second solenoid is transmitted by hydraulic passage 206 via the passage and orifices 340 and 350. Check valves 310, 320 and 330 are disposed in the above-mentioned hydraulic passages 201, 202 and 203.

The first and second solenoid valves 210 and 220 comprise, respectively: moving cores 211 and 221; solenoids 212 and 222; springs 213 and 223; openings 214 and 224; and, hydraulic oil discharging ports 215 and 225. When the solenoids 212 and 222 are turned on, the moving cores 212 and 222 are caused to move upwardly as seen in the drawing to open the ports 214 and 224 whereby the first and second solenoid valves 210 and 220 are hydraulically separated from the hydraulic line pressure passage 104 by means of the orifices 340 and 350 and hydraulic oil in the hydraulic passages 205 and 206 of the first and second solenoid valves is discharged through discharging ports 215 and 225. On the other hand, when the solenoids 212 and 222 are turned off, the moving cores 211 and 221 are caused to move downwardly as seen in the drawing under the effect of a resilient force exerted by springs 213 and 223 to close the ports 214 and 224 whereby a high level of hydraulic pressure (hydraulic line pressure) is generated in the hydraulic passages 205 and 206 of the first and second solenoid valves.

The inhibitor valve 240 includes three spools, that is, first, second and third spools 241, 242 and 243 as seen from the lower part of the drawing. The first spool 241 is formed with a sleeve-shaped land 245 with a spring 244 disposed below the bottom thereof and two lands 246 and 247. The inhibitor valve 240 is formed with a hydraulic chamber 248 at the lower end part, and first and second intermediate hydraulic chambers 249 and 250 located between the sleeve-shaped land 245 and a land 246, and between land 246 and a land 247. A third intermediate hydraulic chamber 251 is located between the first spool 241 and the second spool 242. A hydraulic chamber 252 is located between the second and third spools 242 and 243 and a hydraulic chamber 253 is located at the upper end part thereof. When the first spool 241 is held at the upper position as shown in the drawing, the lower end hydraulic chamber 248 is in communication with the hydraulic governor passage 111 via hydraulic port 245A on the sleeve-shaped land, the hydraulic line/passage 104 communicates with the hydraulic speed reduction passage 202 via the first intermediate chamber 249 and the hydraulic direct connection passage 201 communicates with the hydraulic oil discharging passage 207 via the second intermediate hydraulic chamber 250. On the other hand, when the first spool 241 is held at the lower position as shown in the drawing, the lower end hydraulic chamber 248 is in communication with the hydraulic oil discharging port 254 via the hydraulic port 254A on the sleeve-shaped land 245, the hydraulic speed reduction passage 202 communicates with the hydraulic oil discharging port 255 via the first intermediate hydraulic chamber 249, the hydraulic line pressure passage 104 communicates with the hydraulic direct connection passage 201 via the second intermediate hydraulic chamber 250, the third intermediate hydraulic chamber 251 is normally in communication with the hydraulic governor passage 111, the hydraulic chamber 242 is normally in communication with the hydraulic passage 204 and the upper end hydraulic chamber is normally in communication with the hydraulic passage 206 of the second solenoid valve.

The switching valve 230 is provided with a spring 232 at the lower end part thereof as seen in the drawing and includes a spool 231 with three lands formed thereon. Further, valve 230 is formed with a lower end hydraulic chamber 233, a first intermediae hydraulic chamber 234, a second intermediate hydraulic chamber 235 and an upper end hydraulic chamber 236 as seen from the lower part of the drawing. When the upper end hydraulic chamber 236, with which the hydraulic passage 205 of the first solenoid valve is in communication, is loaded with a high level of hydraulic pressure generated by the solenoid valve, the spool 231 is caused to move downwardly as seen in the drawing and the hydraulic line pressure passage 104 is communicated with the four wheel driving hydraulic passage 203 via the second intermediate hydraulic chamber 235, whereby the hydraulic servo C-4 of the clutch C4 is supplied with hydraulic line pressure. Thus, the hydraulic passage 204 communicates with the hydraulic oil discharging port 237 via the first intermediate hydraulic chamber 234 and hydraulic oil is thereby discharged from the hydraulic chamber 237 with an orifice 239 fitted therein. When hydraulic pressure from the solenoid valve which has been introduced into the upper end hydraulic chamber 236 is reduced to a lower level, the spool 231 is caused to move upwardly as seen in the drawing under the effect of resilient force by spring 232, whereby hydraulic communication is established with the hydraulic line pressure passage 104 via the first intermediate hydraulic chamber 234 and the hydraulic chamber 252, the inhibitor valve 240 being thereby loaded with hydraulic line pressure. Thus, the four wheel driving hydraulic passage 203 communicates with the hydraulic oil discharging port 238 via the second intermediate hydraulic chamber and hydraulic oil is thereby discharged from the hydraulic servo C-4.

Next, the down-shift timing valve 260 is provided with a spring at the lower end part thereof as seen in the drawing and includes a spool 261 with two lands formed thereon. As is apparent from the drawing, valve 260 is formed with a lower end hydraulic chamber 263, an intermediate hydraulic chamber 264 and an upper end hydraulic chamber 265. The lower end hydraulic chamber 263 is normally in communication with the speed reduction hydraulic passage 202, the upper end hydraulic chamber 265 is normally in communication with the hydraulic line pressure passage 104 and the intermediate hydraulic chamber 264 is normally in communication with the hydraulic oil discharging passage 207, a hydraulic oil discharging port with an orifice 267 fitted therein through which hydraulic oil is gradually discharged and a hydraulic oil discharging port 268 through which hydraulic oil is quickly discharged when the spool 261 assumes a predetermined upper position as seen in the drawing. It should be noted that displacing of the spool 261 to its predetermined upper position is achieved at a time when the upper end hydraulic pressure chamber 265 is loaded with hydraulic line pressure lower than a preset level (with throttle opening being reduced) while the spring 262 has a weak spring load, or at time when hydraulic engagement pressure is introduced from the multiplate brake B4 into the lower end hydraulic chamber 263.

In the meanwhile, an OD solenoid valve 270 adapted to actuate so as to make a decision as to whether speed shifting to overdrive stage is possible or impossible is disposed in the hydraulic passage 202. A pressure switch P is electrically connected to the OD solenoid valve in such a manner that when the hydraulic servo B-4 is supplied with pressurized hydraulic oil, switch P is turned off. When hydraulic oil is discharged from the hydraulic servo B-4 to release servo B-4 from the operative state under the effect of hydraulic pressure, switch P is turned on. While the OD solenoid valve 270 is turned on, the automatic transmission makes it possible to effect speed changing to overdrive stage, but while it is turned off, speed changing to overdrive stage cannot be achieved. Further, the OD solenoid valve 270 is constructed in association with actuation of the transfer 40 such that when the speed changing stage in the transfer 40 becomes H2 (directly connected state for two wheel driving) or H4 (directly connected state for four wheel driving), as shown on Table 3 to be described later, while an OD (overdrive) switch 290, disposed at the position located in the proximity of an operator's seat, for making an operative connection to the electrical circuit of the OD solenoid valve 270, is kept in the turned-on state (mixing electrical connection), hydraulic oil is discharged from the hydraulic servo B-4 to release the servo B-4 from the operative state under the effect of hydraulic pressure, causing the OD solenoid valve 270 to be shifted to the turned-on state. In the turned-on state, running with the use of overdrive becomes possible in dependence on the running condition of a motorcar, and when the speed changing stage in the transfer 40 assumes L4 (speed reduced state), the hydraulic servo B-4 is supplied with pressurized hydraulic oil, causing the OD solenoid valve 270 to be shifted to the turned-off state, with the result that the automatic transmission fails to be speed changed to the overdrive stage. When the range of H2, H4 or L4 is determined by actuating a manual shift (shifting switch in the illustrated embodiment) disposed in an operator's seat, the first and second solenoid valves 210 and 220 are turned on or off with the aid of an electric circuit 400A, whereby frictional engagement elements B4, C3 and C4 become effective under the effect of hydraulic oil which is selectively delivered to the hydraulic servos B-4, C-3 and C-4 from the hydraulic control device in the transfer 40, causing the transfer 40 to carry out speed changing to assume a certain speed changing range (H2, H4 or L4).

Operation of the first and second solenoid valves 210 and 220 is as shown on Table 3. In the table, reference letters "ON" designate the turned-on state, reference letters "OFF" designate the turned-off state, reference mark "O" designates operative engagement under the effect of hydraulic oil having a pressure level of hydraulic line pressure and reference mark "X" designates the operative state released from operative engagement. Further, reference letter "A" designates a preset range for the manual valve, reference letter "B" designates the operative state of manual shifting and reference letter 37C" designates the operative state of speed changing in the transfer 40.

TABLE 3

| A | B | 210 | 220 | C |
|---|---|-----|-----|-----|
| D | H2 | ON | OFF | H2 |
| S | H4 | OFF | OFF | H4 |
| L | L4 | OFF | ON | H4 |
|   |    |     |     | L4 |
| N | H2 | ON | OFF | H2 |
| P | H4 | ON | OFF | H2 |
|   | L4 | ON | ON | H2 |

Next, operations in each of the preset ranges for manual shifting of the manual valve and the transfer in the automatic transmission will be described below.

(1) In the case where the manual valve is preset to any one of the ranges D, S, L and R, namely, in the case where governor pressure is outputted in response to running speed of a motorcar:

(a) When the manual shift assumes H2 range and the transfer 40 assumes H2 (directly connected state for two wheel driving), the first solenoid valve 210 is kept in the On state, the second solenoid valve 220 is kept in the OFF state, and the OD solenoid valve 270 is kept in the ON state.

Thus, hydraulic line pressure is introduced into the hydraulic passage 205 for hydraulic pressure of the first solenoid valve from the hydraulic line pressure passage 104 via the orifice 340, but hydraulic oil is drained by means of the first solenoid valve 210 which has been turned on, resulting in hydraulic pressure failing to be outputted to the upper end hydraulic chamber 236, whereby the spool 231 of the switching valve 230 is held at the upper position thereof as seen in the drawing under the effect of resilient force of the spring 232 and hydraulic line pressure is transmitted to the hydraulic chamber 252 via the first intermediate hydraulic chamber 234 and the hydraulic passage 204, causing the second spool 242 and the first spool 241 of the inhibitor valve 240 to be held at the lower position thereof as seen in the drawing. Accordingly, hydraulic line pressure is introduced into the hydraulic servo C-3 of the clutch C3 via the hydraulic line pressure passage 104, the second intermediate hydraulic chamber 250, the hydraulic passage 201 for making direct connection and the check valve C3. At this moment hydraulic oil in the hydraulic servos C-4 and B-4 is drained from the hydraulic oil discharging ports 238 and 255. This causes the transfer 40 to assume H2 (directly connected state for two wheel driving). Further, the automatic transmission makes it possible to carry out speed changing to the overdrive stage.

(b) When the manual shift assumes H4 range and the transfer 40 assumes H4 (directly connected state for four wheel driving), the first solenoid valve 210 is kept in the OFF state,
the second solenoid valve 220 is kept in the OFF state, and
the OD solenoid valve 270 is kept in the ON state.

Thus, hydraulic line pressure is introduced into the hydraulic passage 205 for hydraulic pressure of the first solenoid valve from the hydraulic line pressure passage 104 via the orifice 340, but it is outputted to the upper end hydraulic chamber 236 because the first solenoid valve 210 is turned off, whereby the spool 231 of the switching valve 230 is held at the lower position thereof. This causes hydraulic line pressure to be introduced into the hydraulic servo C-4 of the clutch C4 via the hydraulic line pressure passage 104, the second intermediate hydraulic chamber 235 and the four wheel driving hydraulic passage 203 with a check valve 330 disposed therein. On the other hand, hydraulic line pressure is introduced into the hydraulic passage 206 of hydraulic pressure of the second solenoid valve via an orifice 350 but it is outputted to the upper end hydraulic chamber 253 because the second solenoid valve 220 is turned off, whereby the third, second and first spools 243, 242 and 241 of the inhibitor valve 240 are held at the lower position thereof as seen in the drawing. This causes hydraulic line pressure to be introduced into the hydraulic servo C-3 of the clutch C3. At this moment hydraulic oil in the hydraulic servo B-4 is drained through the hydraulic oil discharging port 255. Thus, the transfer 40 assumes H4 (directly connected state for four wheel driving). The automatic transmission is free to carry out speed changing to the overdrive stage.

(c) When the manual shift assumes L4 range and the transfer 40 assumes H4 (directly connected state for four wheel driving) while the running speed of a motorcar exceeds the preset level, the first solenoid valve 210 is kept in the OFF state,
the second solenoid valve 220 is kept in the ON state, and
the OD solenoid valve 270 is kept in the ON state.

Thus, hydraulic line pressure is introduced into the hydraulic passage 205 for hydraulic pressure of the first solenoid valve 210 from the hydraulic line pressure passage 104 via the orifice 340 but it is inputted into the upper end hydraulic chamber 236 because the first solenoid valve 210 is turned off, whereby the spool 231 of the switching valve 230 is held at the upper position thereof as seen in the drawing. This causes hydraulic line pressure to be introduced into the hydraulic servo C-4 of the clutch C4. On the other hand, hydraulic line pressure is introduced into the hydraulic passage 206 of hydraulic pressure of the second solenoid valve from the hydraulic line pressure passage 104 via the orifice 350, but hydraulic oil is drained with the aid of the second solenoid valve 220 which has been turned on. Thus, no hydraulic pressure is inputted into the upper end hydraulic chamber 252. Since hydraulic pressure of the governor valve is inputted into the third intermediate hydraulic chamber 251 at this moment, both the second and third spools 242 and 243 are caused to move upwardly as seen in the drawing and hydraulic pressure of the governor valve exceeds the preset level, whereby the first spool 241 is held at the lower position thereof as seen in the drawing against resilient force of the spring 244. Accordingly, hydraulic line pressure is introduced into the hydraulic servo C-3 of the clutch C3. Hydraulic oil in the hydraulic servo B-4 is drained via the hydraulic oil discharging port 255. Thus, the transfer 40 assumes H4 (directly connected state for four wheel driving). It becomes impossible for the automatic transmission to achieve speed changing to the overdrive state.

(d) When the manual shift assumes L4 range and the transfer 40 assumes L4 (four wheel driving state at a reduced running speed) while running speed is reduced lower than the preset level, the first solenoid valve 210 is kept in the OFF state,
the second solenoid valve 220 is kept in the ON state, and
the OD solenoid valve 270 is kept in the OFF state.

Thus, hydraulic line pressure is introduced into the hydraulic passage 205 for hydraulic pressure of the first solenoid valve from the hydraulic line pressure passage 104 via the orifice 340, but it is inputted into the upper end hydraulic chamber 236 because the first solenoid valve 210 is turned off, whereby the spool 231 of the switching valve 230 is held at the lower position thereof. This causes hydraulic line pressure to be introduced into the hydraulic servo C-4 of the clutch C4. On the other hand, hydraulic line pressure is introduced into the hydraulic passage 206 for hydraulic pressure of the second solenoid valve from the hydraulic line pressure passage 104 via the orifice 350, but hydraulic oil is drained with the aid of the second solenoid valve 220 which has been turned on. Thus, no hydraulic pressure is inputted into the upper end hydraulic chamber 253 of the inhibitor valve 240. Further, no hydraulic line pressure is introduced into the hydraulic chamber 252. Since hydraulic pressure of the governor valve is inputted into the third intermediate hydraulic chamber 251 at this moment, both the second and third spools are caused to move upwardly as seen in the drawing and hydraulic pressure of the governor valve is reduced lower than the preset level, whereby the first spool 241 is held at the upper position thereof as seen in the drawing and hydraulic pressure of the governor valve is inputted into the lower end hydraulic chamber 248 via the hydraulic oil port 254A on the sleeve-shaped land 245. Accordingly, hydraulic line pressure is introduced into the hydraulic servo B-4 of the brake B4 via the speed reduction hydraulic passage 202 and the check valve 320. Hydraulic oil in the hydraulic servo C-3 is drained from the hydraulic oil discharging ports 266 and 268 via the direct connection hydraulic passage 201, the second intermediate hydraulic chamber 250, the hydraulic oil discharging passage 207 and the intermediate hydraulic chamber 264 of the down-shift timing valve 260. Thus, the transfer 40 assumes L4 (four wheel driving state at a reduced running speed). Further, it becomes impossible for the automatic transmission to achieve speed changing to the overdrive state.

Since the first spool 241 of the inhibitor valve 240 is so designed that a cross-sectional area of both the upper and lower end faces located opposite to the third intermediate hydraulic chamber 251 and the lower end hydraulic chamber is determined to be the same relative to one another, spool 241 is caused to move upwardly as seen in the drawing until hydraulic pressure of the governor valve is introduced into both the third intermediate hydraulic chamber 251 and the lower end hydraulic chamber 248. As a result, spool 241 is not displaced downwardly as seen in the drawing, even when hydraulic pressure of the governor valve (corresponding to running speed of a motorcar) and spool 241 is maintained at the upper position thereof as seen in the drawing under the effect of resilient load of the sring 244, unless the manual shift is determined at H2 range or H4 range so as to allow hydraulic line pressure to be introduced into the hydraulic chamber 252 or the upper end hydraulic chamber 244. Accordingly, when the manual shift is set at L4 range and running speed of a motorcar (depending on hydraulic pressure of the governor valve) is once determined to be lower than the preset level so as to assume L4, this range of L4 is still maintained irrespective of how high the running speed of a motorcar (depending on hydraulic pressure of the governor valve) is increased.

(2) In the case where the manual valve is preset to N range or P range, namely, in the case where hydraulic pressure of the governor valve fails to be outputted:

(e) When the manual shift assumes L4 range, the first solenoid valve 210 is kept in the ON state,
the second solenoid valve 220 is kept in the ON state, and
the OD solenoid valve 270 is kept in the ON state.

Thus, hydraulic line pressure is introduced into the hydraulic passage 205 for hydraulic pressure of the first solenoid valve from the hydraulic line pressure passage 104 via the orifice 340 but hydraulic oil is drained with the aid of the first solenoid valve 210 without any occurrence of outputting of hydraulic pressure into the upper end hydraulic chamber 236. Thus, the spool 231 of the switching valve 230 is held at the upper position thereof as seen in the drawing under the effect of resilient force of the spring 232 and the hydraulic chamber 252 in the inhibitor valve 240 is loaded with hydraulic line pressure which is transmitted thereto via the hydraulic line pressure passage 104, the first intermediate hydraulic chamber 234 and the hydraulic passage 204, whereby the second spool 242 and the first spool 241 of the inhibitor valve 240 are held at the lower position thereof as seen in the drawing. This causes hydraulic line pressure to be introduced into the hydraulic servo C-3 of the clutch C3. Hydraulic oil in both the hydraulic servos C-4 and B-4 is drained through hydraulic oil discharging ports 238 and 255. As a result, the transfer 40 assumes H2 (directly connected state for two wheel driving).

(f) When the manual shift assumes H2 range, and
(g) When the manual shift assumes H4,
the first solenoid valve 210 is kept in the ON state,
the second solenoid valve 220 is kept in the OFF state, and
the OD solenoid valve 270 is kept in the ON state.

The above-mentioned cases are such that in addition to the operative state as is seen in the case (e) hydraulic line pressure is introduced into the upper end hydraulic chamber 253 of the inhibitor valve 240, but both the switching valve 230 and the inhibitor valve 240 are caused to operate in the same manner as in the foregoing case. Thus, the hydraulic servo C-3 of the clutch C3 is supplied with hydraulic line pressure but both the hydraulic servos B-4 and C-4 are released from the operative state under the effect of hydraulic pressure, resulting in the transfer 40 assuming H2.

Figure 5:
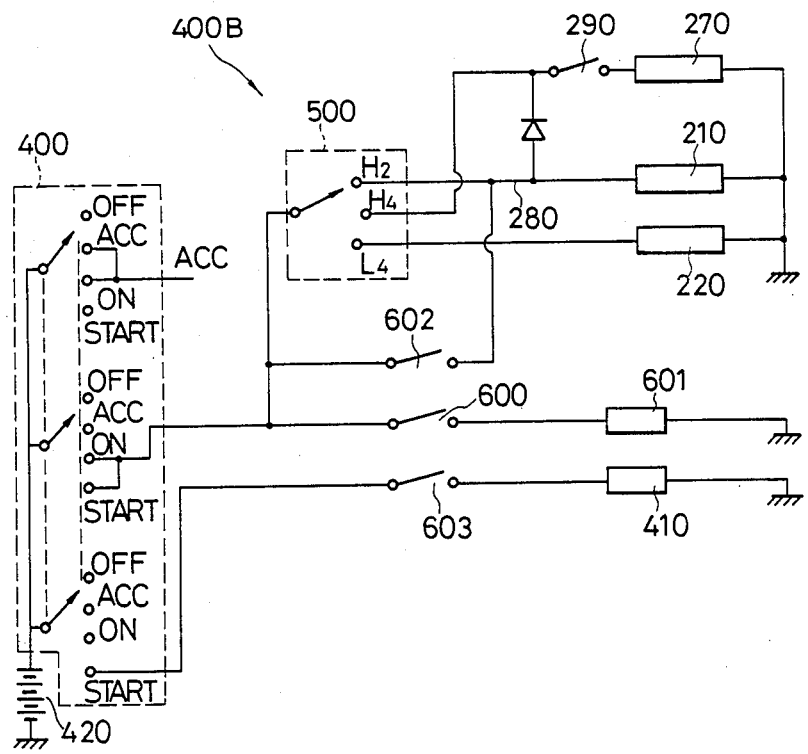
FIG. 5 is an electrical circuit diagram usable for controlling the speed changing control device.
Figure 6:
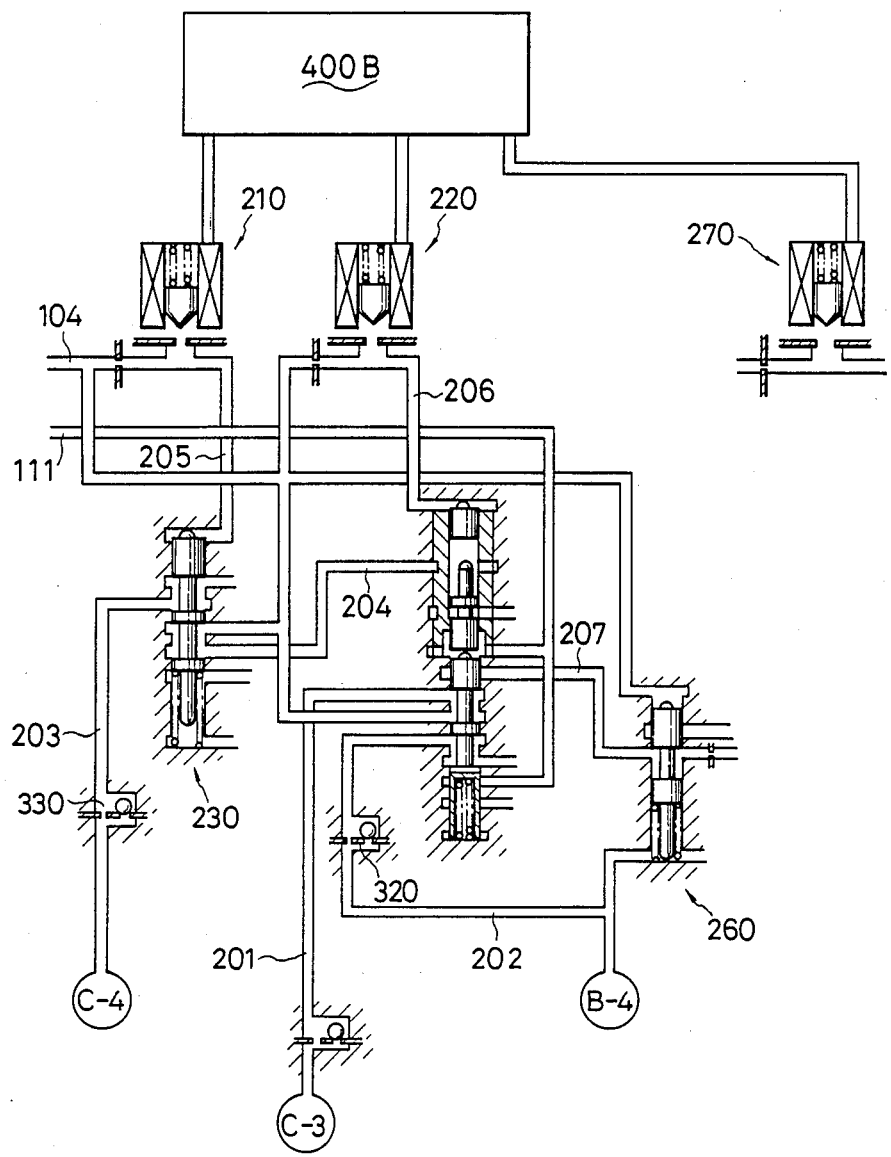
FIG. 6 is a hydraulic circuit diagram of the hydraulic control device for the four wheel driving transfer in accordance with the second embodiment of the invention.

FIGS. 5 and 6 schematically illustrate an automatic transmission in accordance with the second embodiment of the invention. Same or similar parts or components as those in the first embodiment are identified hereinafter by same reference numerals.

FIG. 5 illustrates an electric circuit 400B adapted to open and close first and second solenoid valves 210 and 220 and OD solenoid valve 270 in dependence on preset ranges (P, R, N, D, S, L) allocated to the manual valve in the automatic transmission and preset ranges of the manual shift in the transfer 40 as shown on Table 3. Reference numeral 400 designates an ignition switch, reference numeral 410 designates a starter, reference numeral 420 designates a battery and reference numeral 500 a manual shift, that is, a shifting switch for the transfer 40. As is apparent from the drawing, the manual shift 500 includes a plurality of ranges of H2, H4 and L4. While it assumes H2 range, the first solenoid valve 210 is electrically connected to an electrical circuit 280 which is turned on but while it assumes H4 range, it fails to be electrically connected to the same. On the other hand, while solenoid valve 210 assumes L4 range, it is connected to the second solenoid valve 220. Further, the first solenoid valve 210 is short circuited to the ignition switch 400 via a relay contact 602 and the OD solenoid valve 270 with an OD switch 290 fitted thereto includes an electric circuit which is normally turned on. The electric circuit of the OD solenoid valve 270 is electrically connected in parallel to an electric circuit of the first solenoid valve 210 which is normally turned on. Reference numeral 600 designates a neutral safety switch which is so arranged that engine starting can be initiated only at N and P ranges. When the shift lever in the automatic transmission is preset to N range or P range, the safety neutral switch 600 is shifted to the turned-on state and thereby the relay 601 is actuated. In response to actuation of the relay 601 both relay contacts 602 and 603 are shifted to the turned-on position whereby the first solenoid valve 210 is turned on (to assume the ON state) regardless of the preset range (H2, H4 and L4) of the shifting switch 500.

In this embodiment the OD solenoid valve 270 is adapted to make a decision as to whether speed changing to the overdrive state is possible or impossible and is electrically connected in parallel to the electrical circuit 280 of the first solenoid valve 210 in the transfer which is normally turned on. While the OD solenoid valve 270 is turned on, it becomes possible to effect speed changing to the overdrive stage in the automatic transmission. On the contrary, while it is turned off, it becomes impossible to do so. Further, when the speed changing stage in the transfer 40 assumes H2 (directly connected state for two wheel driving) or H4 (directly connected state for four wheel driving), in dependence on turning-on or turning-off of the first solenoid valve 210 as shown on Table 3, while the OD (overdrive) switch 290 disposed on the operative electric circuit at the position located by an operator's seat is turned on (in the electrically connected state), the OD solenoid valve 270 is shifted to the turned-on state, whereby running of a motorcar at the overdrive stage can be achieved in dependence on the running conditions of a motorcar. On the contrary, when the first solenoid valve 210 is turned off and the transfer 40 assumes speed changing stage of L4 (four wheel driving state at a reduced running speed), the OD solenoid valve 270 is shifted to the turned-off state whereby speed changing to the overdrive stage in the automatic transmission cannot be achieved. When a range of H2, H4 or L4 is determined by actuating the manual shift (shifting switch in this embodiment) located in an operator's seat, both the first and second solenoid valves 210 and 220 are controlled in the ON-OFF manner as shown on Table 3 by means of the electric circuit 400B in FIG. 5, whereby each of the frictional engagement elements B4, C3 and C4 is actuated under the effect of working hydraulic oil which is selectively fed to the hydraulic servos B-4, C-3 and C-4 from the hydraulic control device 200 in the transfer 40. Thus, the transfer 40 can carry out speed changing to a required speed changing range (H2, H4 or L4).

FIGS. 7 to 13 illustrate an automatic transmission in accordance with the third embodiment of the invention.

Figure 7:
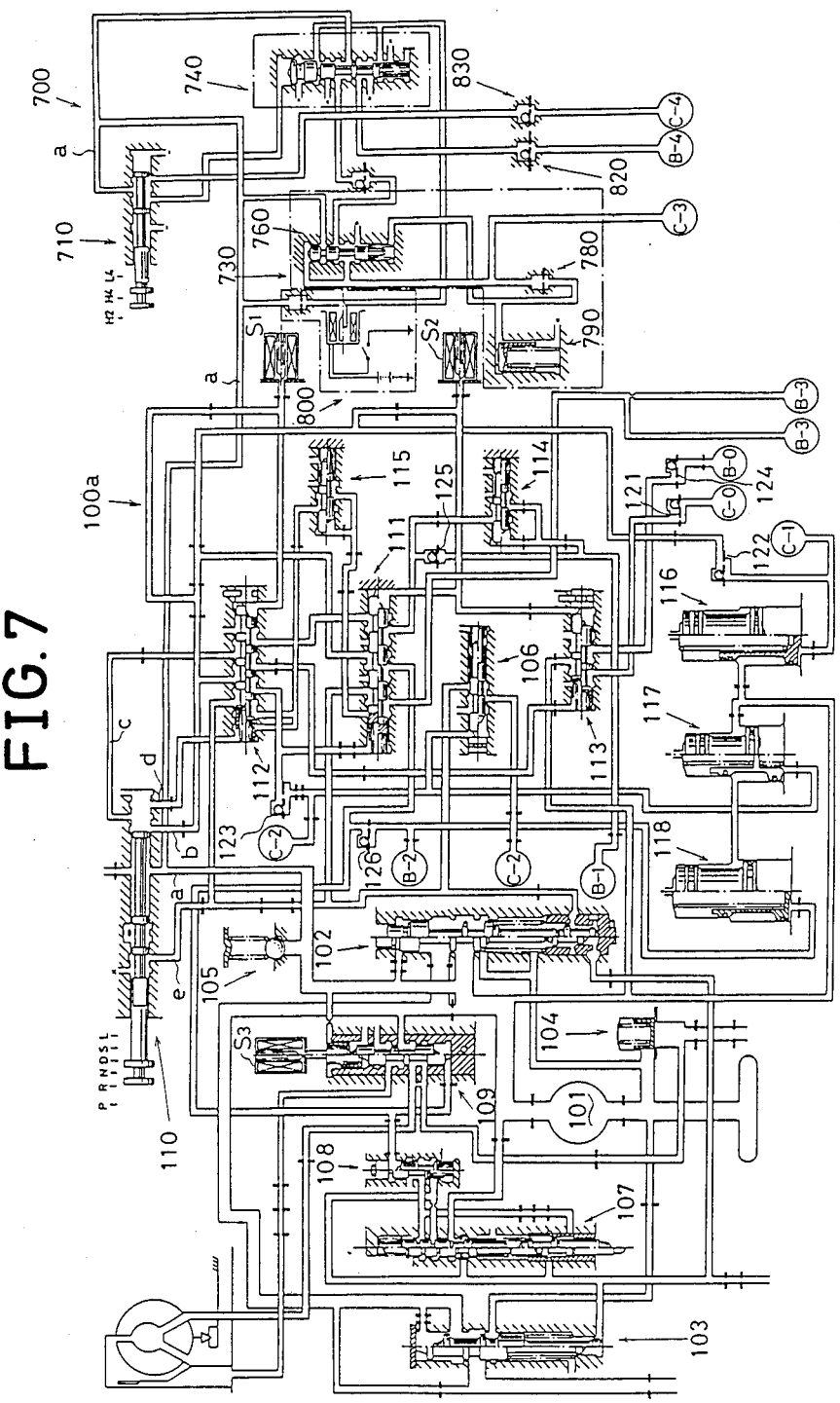
FIG. 7 is a hydraulic circuit diagram for the hydraulic control device for the four wheel driving automatic transmission in accordance with the third embodiment of the invention.

The automatic transmission for four wheel driving in accordance with this embodiment is so constructed that engagement or disengagement of each of clutches and brakes serving as a frictional engagement element is selectively achieved in dependence on running conditions of a motorcar such as throttle opening, running speed of a motorcar or the like with the aid of the hydraulic control device 100a in the automatic transmission 100a as shown in FIG. 7 and automatic speed changing for forward movement inclusive of overdrive (O/D) by way of four stages, as well as manual speed changing for rearward movement merely by way of one stage, are carried out.

A shift lever (not shown) disposed in an operator's seat for actuating the manual valve in the hydraulic control device 100a includes shift positions SP comprising P (parking), R (reverse), N (neutral), D (drive), S (second) and L (low). An operative relation among shift positions, speed changing stages comprising fourth speed (4), third speed (3), second speed (2) and first speed (1), clutches and brakes are as shown on Table 4.

Referring to Table 4 reference mark "O" designates engagement of frictional engagement elements, reference mark "X" designates disengagement of the same, reference letter "F" (free) designates free rotation of one-way clutch and reference letter "L" (lock) designates engagement of the one-way clutch.

TABLE 4

| SP | | clutch | | | brake | | | | OWC | | |
|---|---|---|---|---|---|---|---|---|---|---|---|
| | | C0 | C1 | C2 | B0 | B1 | B2 | B3 | F0 | F1 | F2 |
| P | | o | x | x | x | x | x | x | | | |
| R | | o | x | o | x | x | x | o | L | F | F |
| N | | o | x | x | x | x | x | o | | | |
| D | 1 | o | o | x | x | x | x | x | L | F | L |
|   | 2 | o | o | x | x | x | o | x | L | L | F |
|   | 3 | o | o | o | x | x | o | x | L | F | F |
|   | 4 | x | o | o | o | x | o | x | F | F | F |
| S | 1 | o | o | x | x | x | x | x | L | F | L |
|   | 2 | o | o | x | x | o | o | x | L | L | F |
|   | 3 | o | o | o | x | x | o | x | L | F | F |
| L | 1 | o | o | x | x | x | x | o | L | F | L |
|   | 2 | o | o | x | x | o | o | x | L | L | F |

The automatic control device 100a for the automatic transmission for running of a motorcar at four stages of speed essentially comprises a hydraulic pump 101, a pressure adjusting valve (regulator valve) 102, a second pressure adjusting valve 103, a cooler bypass valve 104, a pressure relief valve 105, a reverse clutch sequence valve 106, a throttle valve 107 for generating throttled pressure in dependence on throttle opening, a cut-back valve 108, a directly connected clutch control valve 109, a manual valve 110, a 1–2 shift valve 111, a 2–3 shift valve 112, a 3–4 shift valve 113, a solenoid valve S1 for controlling the 1–2 shift valve 111 and the 3–4 shift valve 113, a solenoid valve S2 for controlling the 2–3 shift valve 112 and the 3–4 shift valve 113, a solenoid valve S3 for controlling the directly connected clutch valve 109, an intermediate coast modulator valve 114 for adjusting hydraulic pressure of hydraulic oil to be fed to the brake B1, a low coast modulator valve 115 for adjusting hydraulic pressure of hydraulic oil to be fed to the brake B3, an accumulator 116 for the clutch C1, an accumulator 117 for the clutch C2, an accumulator 118 for the brake B2, flow rate control valves 121, 122, 123, 124, 125 and 126 for controlling a flow rate of hydraulic oil to be fed to clutches C0, C1 and C2 as well as brakes B0, B1 and B2, each of the flow control valves being equipped with a check valve and a plurality of hydraulic passages by way of which hydraulic servos B-0, B-1, B-2, B-3 and B-4 for brakes B0, B1, B2, B3 and B4, hydraulic servos C-0, C-1, C-2, C-3 and C-4 for clutches C0, C1, C2, C3 and C4, associated valves and hydraulic cylinders for actuating clutches and brakes communicate with one another. Each of the solenoid valves S1, S2 and S3 is turned on or off in dependence on running conditions such as running speed, engine load or the like with the aid of an electronic control device to be described later, whereby the 1–2 shift valve 111, the 2–3 shift valve 112 and the 3–4 shift valve 113 are controlled. These shift valves 111, 112 and 113 serve to selectively communicate each of clutches and brakes with hydraulic power source in dependence on the preset position of the manual valve 110.

The manual valve 110 is operatively connected to a shift lever disposed in an operator's seat and moves to any one of positions P (parking), R (reverse), N (neutral), D (drive), S (second) and L (low) in accordance with the certain range assumed by the shift lever by actuating the latter.

Table 5 shows how a hydraulic passage a is communicated with hydraulic passages b to e at a certain range selected by the shift lever. In the table, reference mark "o" designates the case where hydraulic communication is estabished therebetween and hydraulic pressure is thereby transmitted thereto and reference mark "x" designates the case where hydraulic pressure is released therefrom.

TABLE 5

| | P | R | N | D | S | L |
|---|---|---|---|---|---|---|
| hydraulic passage b | x | x | x | o | o | o |
| hydraulic passage c | x | x | x | x | o | o |
| hydraulic passage d | x | x | x | x | x | o |
| hydraulic passage e | x | o | x | x | x | x |

Figure 8:
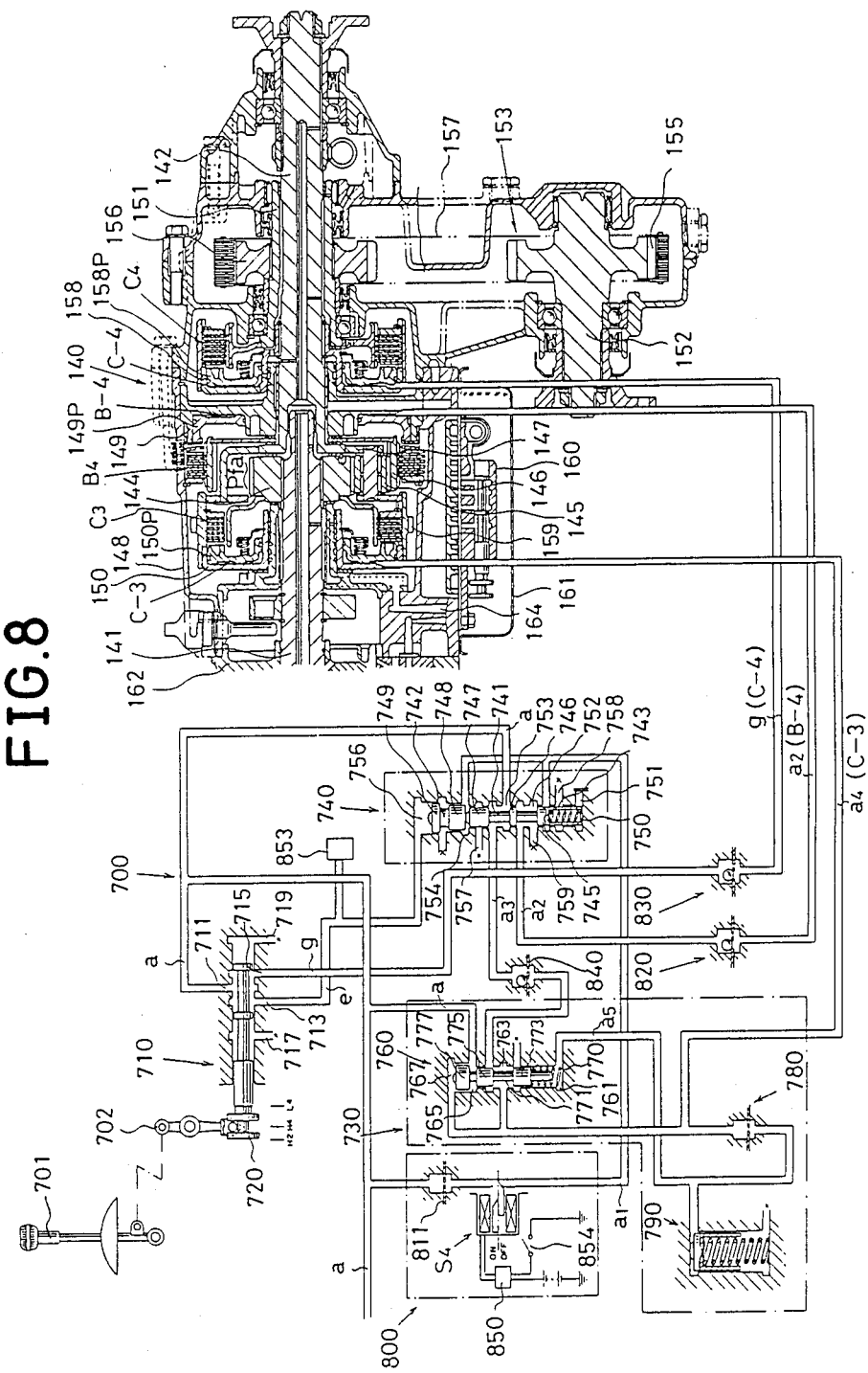
FIG. 8 is a combination of a vertical sectional view of the four wheel driving transfer in accordance with the third embodiment of the invention and a hydraulic circuit diagram of the hydraulic control device therefor.
Figure 9:
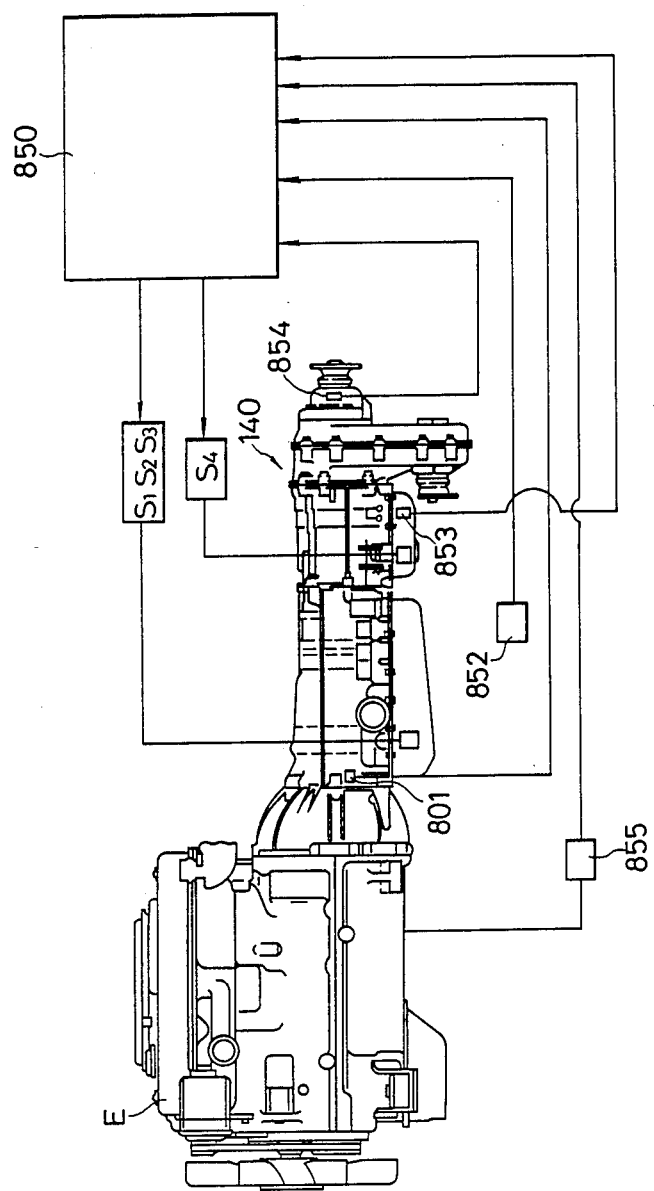
FIG. 9 is a side view of an engine to which a combination of four wheel driving automatic transmission and transfer in accordance with the third embodiment of the invention is attached.
Figure 10:
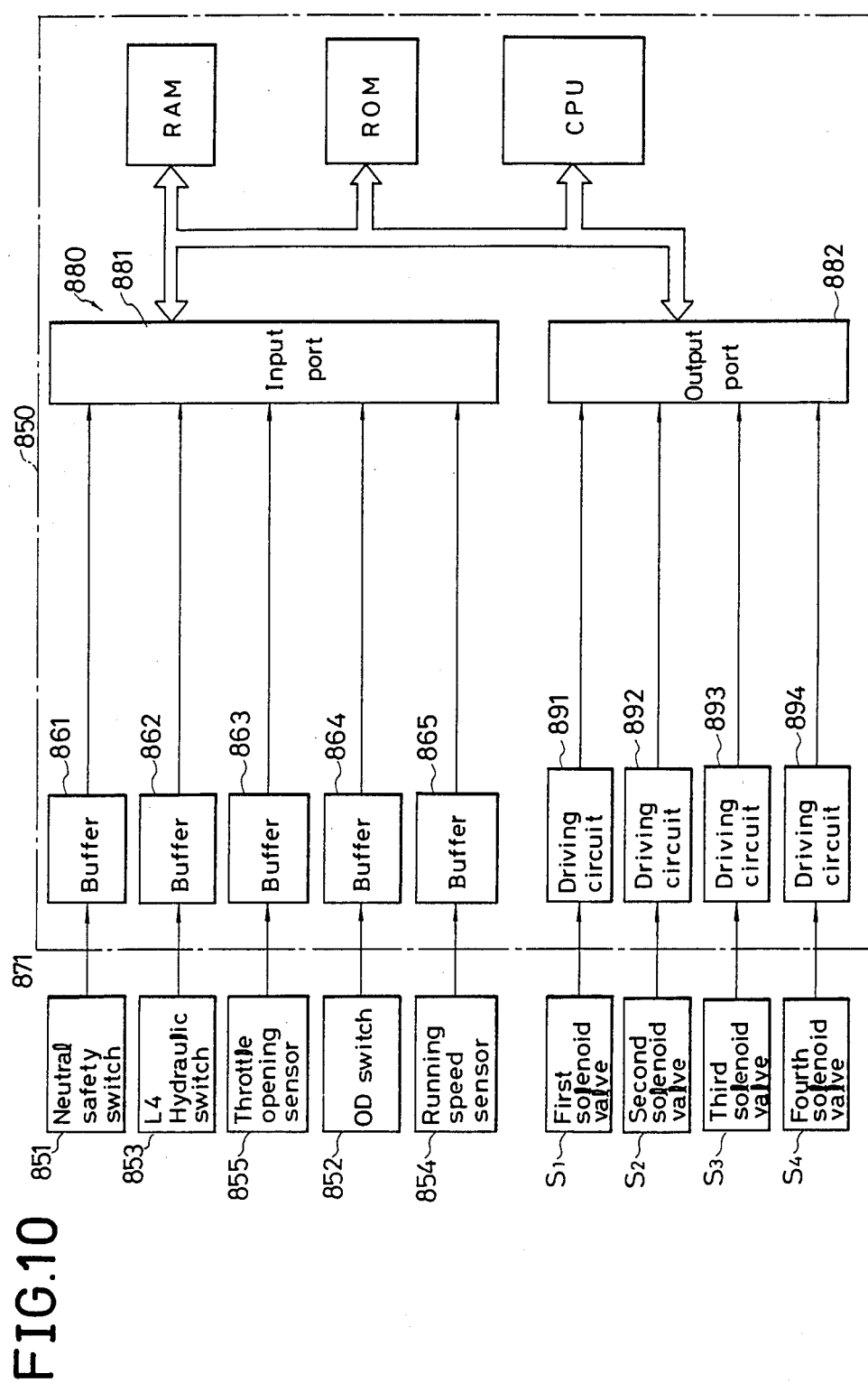
FIG. 10 is a block diagram particularly illustrating the structure of the four wheel driving transfer in accordance with the third embodiment of the invention.

Referring to FIG. 8, a transfer 140 essentially comprises a first output shaft 142 operatively connected to an input shaft 141 which serves as an output shaft for clutch C3, brake B4 and clutch C4, each of which operates as a frictional engagement element and planetary gear sets P1 and P2, a planetary gear set Pfa arranged between the input shaft 141 and the first output shaft 142, a four wheel driving sleeve 151 rotatably fitted onto the first output shaft 42, a second output shaft 152 disposed in parallel with the input shaft 141 while extending in the opposite direction to the first output shaft 142 and a power transmitting mechanism arranged between the sleeve 151 and the second output shaft 152. Specifically, the planetary gear set Pfa includes a sun gear 144 spline fitted onto the end part of the input shaft 141, a planetary pinion 145 meshing with the sun gear 144, a ring gear 146 meshing with the planetary pinion 145 and a carrier 147 operatively connected to the foremost end of the first output shaft 142 to rotatably hold the planetary pinion 145. The brake B4 is designed in the form of a multiplate frictional engagement brake for establishing operative engagement of the ring gear 146 to transfer case 148 and it is actuated by means of the hydraulic servo B-4 which is constituted by a combination of cylinder 149 formed in the transfer case 148 and piston 149P slidably fitted into the cylinder 149. The clutch C3 is located on the side of the four speed automatic transmission as seen from the planetary gear set Pfa so as to establish and interrupt operative connection between the sun gear 144 and the carrier 147. Clutch C3 is actuated by means of the hydraulic servo C-3 which is constituted by a combination of cylinder 150 operatively connected to the carrier 147 and a piston slidably fitted into the cylinder 150. The clutch C4 is designed in the form of a multiplate frictional clutch so as to establish and interrupt operative connection between the first output shaft 142, operatively connected to the clutch C4 and a sleeve 151 operatively connected to one sprocket 156 in the power transmitting mechanism 153 for the second output shaft 152 in the transfer 140. Clutch C4 is actuated by means of the hydraulic servo C-4 which is constituted by a combination of cylinder 158 rotatably supported in the transfer case 148 and piston 158p slidably fitted into the cylinder 158. The power transmission mechanism 153 comprises a sprocket 156 spline fitted onto the sleeve 151, a sprocket 155 integrally made with the second output shaft 152 and an endless chain 157 running between both the sprockets 156 and 155 while extending thereabout.

A parking gear 159 is formed around the outer periphery of a cylinder 150 of the hydraulic servo C-3 and a ratchet is brought into engagement with a parking pawl (not shown) when the shift lever of the four speed automatic transmission is selectively shifted to the parking position, whereby the first output shaft 142 is held immovably.

In the drawing, reference numeral 160 designates a transfer valve body in which a hydraulic control device for feeding pressurized hydraulic oil to the hydraulic servos C-3, C-4 and B-4 for the clutches C3 and C4 and the brake B-4 in the four speed automatic transmission 140 is housed and reference numeral 161 designates an oil pan for the transfer valve body 160. Hydraulic oil which has been fed to the hydraulic servos C-3, C-4 and B-4 for the clutches C3 and C4 and the brake B-4 is introduced into the transfer valve body 106 with a transfer control device 700 fitted thereto via a hydraulic passage 164 extending through both the transmission case 162 and the transfer case 148.

While a motorcar runs at a normal running speed, the hydraulic servo C-3 is loaded with hydraulic line pressure which has been transmitted to the hydraulic control device of the automatic transmission in order that the clutch C3 achieve the engaged state, and at the same time, hydraulic oil is discharged from both the hydraulic servos B-4 and C-4 so as to allow the brake B4 and the clutch C4 to be released from the engaged state. Thus, the sun gear 144 is operatively connected to the carrier 147 in the planetary gear set Pfa, whereby rotational force is transmitted to the first output shaft 142 via the input shaft 141 at a speed reduction ratio of 1 and two wheel driving is achieved only with the rear wheels. At this moment, rotational force from the input shaft 141 is transmitted from the carrier 147, not via the sun gear 144, the planetary pinion 145 and the ring gear 146, but via the clutch C3. This leads to no load being exerted on the teeth face of each of the gears, resulting in running life of the gears being extended remarkably. If the need for four wheel driving arises during two wheel driving, a shift lever 701 disposed in an operator's seat is actuated manually and the clutch C4 is thereby smoothly brought into the engaged state as hydraulic line pressure is gradually transmitted to the hydraulic servo C-4 in the transfer control device 700. As a result, the first output shaft 142, is operatively connected to the sleeve 151 and rotational force is thereby also transmitted to the front wheels via the power transmission mechanism 153, the second output shaft 152 and the propeller shaft B (shown in FIG. 3) while rotational force is transmitted from the input shaft 141 to both the first output shaft 142 and the second output shaft 152 at a speed reduction ratio of 1, resulting in four wheel driving at the directly connected state (four wheel driving at a higher running speed) being assured. If the need arises for increased output torque during four wheel driving, on a steeply inclined road or the like, the shift lever 701 is actuated manually and hydraulic pressure is thereby transmitted to the hydraulic servo and exerted on the inhibitor valve 740, which serves as switching valve for switching four wheel driving state at a higher running speed (H4) to four wheel driving state at a lower running speed (L4) and vice versa. Thus, hydraulic line pressure is gradually transmitted to the hydraulic servo B-4 and hydraulic oil is discharged from the hydraulic servo C-3 in the properly determined timing relation, whereby the brake B4 is gradually brought in the engaged state and the clutch C3 is smoothly disengaged from the operative state. This causes the sun gear 144 to be disconnected from the carrier 147 and the ring gear 146 is held immovably. Thus, rotational force is transmitted from the input shaft 141 to both the first output shaft 142 and the second output shaft 152 at a speed reduced state via the sun gear 144, the planetary pinion 145 and the carrier 147, resulting in four wheel driving state at a reduced running speed accompanied by a high level of torque (four wheel running state at lower running speed). Table 6 shows the engaged and disengaged states of the brake B4 and the clutches C3 and C4 and the running state of a motorcar relative to preset range of the manual shift in the transfer 140.

TABLE 6

| selected range of manual shift | running state | frictional engagement element | | | speed reduction ratio |
|---|---|---|---|---|---|
| | | C3 | B4 | C4 | |
| H2 | two wheel driving at the directly connected state | o | x | x | 1 |
| H4 | four wheel driving at the directly connected state | o | x | o | 1 |
| L4 | four wheel driving at the directly connected state | o | x | o | 1 |
| L4 | four wheel driving at a reduced running speed | x | o | o | 3.0 |

In Table 6, reference mark "o" designates the case where the frictional engagement element is in the engaged state and reference mark "x" designates the case where the frictional engagement element is released from the engaged state. Speed reduction ratio (for instance, 3.0 as shown on the table) is calculated in accordance with a calculation formula, wherein the speed reduction ratio = $(1+\lambda)/\lambda = 3.0$ when it is assumed that a ratio of number of teeth of the sun gear 144 to that of the ring gear 146 in the planetary gear mechanism is identified by "$\lambda$" and this ratio of number of teeth equals 0.5.

The transfer control device 700 in the four wheel driving transfer 140 comprises a transfer manual valve 710 operatively connected to the shift lever 701 disposed in an operator's seat via a link mechanism 702, an inhibitor valve 740 for shifting from high speed running (at the directly connected state) to low speed running (at a reduced speed) and vice versa, an accumulator control valve 760 located between the inhibitor valve 740 and the hydraulic servo C-3, an upshift timing mechanism 730 (for shifting L4 to H4) including an accumulator 790 and a throttle 780, a transfer control device 800 for controlling hydraulic pressure (hydraulic pressure related to running speed of a motorcar) inputted into the inhibitor valve 740 via the hydraulic passage a1 which is communicated with the hydraulic passage a and moreover inhibiting speed changing from high speed stage to low speed stage when running speed of a motorcar exceeds a preset level to be described later, a throttle 820 having a check valve fitted thereto, the throttle 820 being disposed in a hydraulic oil discharging passage a2 through which working hydraulic oil is delivered to the hydraulic servo B-4, a throttle 830 having a check valve fitted thereto, the throttle 830 being disposed in a hydraulic oil discharging passage g through which hydraulic oil is delivered to the hydraulic servo C-4, and a throttle 840 having a check valve fitted thereto, the throttle 830 being disposed in a hydraulic oil discharging passage a3 by way of which the up-shift timing mechanism 730 is hydraulically communicated with the inhibitor valve 740.

As is apparent from the drawing, the transfer manual valve 710 includes a spool 720 which is operatively connected to a shift lever 701 disposed in an operator's seat. Further, the transfer manual valve 710 is formed with an in-port 711 which communicates with the hydraulic line pressure generating passage a in the hydraulic control circuit of the four speed automatic speed transmission, an out-port 713 which communicates with a hydraulic passage e, and an out-port 715 which communicates with a hydraulic passage g and drain ports 717 and 719. When the spool 720 assumes a two wheel driving position (H2), the transfer manual valve 710 allows the hydraulic passage a to communicate with the hydraulic passage 713 and moreover valve 710 allows the hydraulic passage g to communicate with the drain port 719. On the other hand, when the spool 720 assumes a high speed four wheel driving position (H4), the transfer manual valve 720 allows the hydraulic passages a, f and g to communicate with one another. When the spool assumes a low speed four wheel driving position (L4), the hydraulic passage a communicates with the hydraulic passage g and the hydraulic passage f communicates with the drain port 717.

The inhibitor valve 740 includes a spool 741 with a spring 750 disposed below the bottom thereof as seen in the drawing and a plunger 742 disposed in vertical alignment with the spool 741. The spool 741 is formed with a sleeve-shaped land 745 with the spring 750 disposed at the lower end part as seen in the drawing, a land 747 located at the upper end part as seen in the drawing and an intermediate land 746, wherein the lands 745, 747 and 746 are designed to have the same diameter. The plunger 742 is formed with a lower land 748 having a diameter larger than that of the lands of the spool 741 and an upper land 749 having a diameter larger than that of the lower land 748. Owing to arrangement of both the spool 741 and the plunger 742 made in that way, the inhibitor valve 740 is formed with a lower end hydraulic chamber 751, first and second intermediate hydraulic chambers 752 and 753 located between the sleeve-shaped land 745 and the intermediate land 746 as well as between the intermediate land 746 and the upper end land 747, a hydraulic chamber 754 located between the spool 741 and the plunger 742 and an upper end hydraulic chamber 756.

When the spool 741 is held at the upper position thereof, the lower end hydraulic chamber 751 hydraulically communicates with the speed reduction hydraulic passage a1 via an hydraulic oil port 743 on the sleeve-shaped land 745, the first intermediate hydraulic chamber 752 serves to establish hydraulic communication between the hydraulic line pressure passage a and the speed reduction hydraulic line pressure passage a2 and the second intermediate hydraulic chamber 753 serves to establish hydraulic communication between the direct connection hydraulic passage a3 and the drain port 757. On the other hand, when the spool 741 is held at the lower position thereof as seen in the drawing, the lower end hydraulic chamber 751 hydraulically communicates with the drain port 758 via an hydraulic oil port 743 on the sleeve-shaped land 745, the first intermediate hydraulic chamber 752 serves to establish hydraulic communication between the speed reduction hydraulic passage a2 and the drain port 759, the second intermediate hydraulic chamber 753 serves to establish hydraulic communication between the hydraulic line pressure passage a and the direct connection hydraulic passage a3, the hydraulic chamber 754 normally communicates with the hydraulic pressure generation hydraulic passage a1 which is associated with running speed of a motorcar and the upper end hydraulic chamber 756 normally communicates with the hydraulic passage e.

The accumulator control valve 760 includes a spool 771 with a spring 770 disposed below the bottom thereof and the spool 771 is formed with a lower end land 773, an intermediate land 775 and an upper end land 777 of a diameter which is larger than that of the lands 773 and 775. Further, the accumulator control valve 760 is formed with a lower end hydraulic chamber 761, intermediate hydraulic chambers 763 and 765 and an upper end hydraulic chamber 767 as seen from the lower side of the drawing.

More particularly, the accumulator control valve 760 is so constructed that the lower intermediate hydraulic chamber 763 normally communicates with the hydraulic passage a4 which is in communication with the hydraulic servo C-3, the upper intermediate hydraulic chamber 765 normally communicates with the hydraulic line pressure passage a, the upper end hydraulic chamber 767 is normally fed back with hydraulic pressure of the hydraulic passage a4 and the lower end hydraulic chamber 761 is loaded with hydraulic pressure of the hydraulic passage a5 which communicates with the hydraulic passage a4 via the throttle 780 and the accumulator 790.

Next, the transfer automatic control mechanism 800 includes a motorcar speed sensor 854, an electronic control device 850 in which output of the motorcar speed sensor 854 is utilized as an input, a throttle disposed in the hydraulic passage a1 which is in communication with the hydraulic passage a and an electromagnetic solenoid valve S4 adapted to be turned on and off in response to output from the electronic control device 850. When running speed of a motorcar is determined to be lower than a preset level to be described later, valve S4 is turned off whereby hydraulic line pressure equal to that of the hydraulic passage a is generated in the hydraulic passage a1 and hydraulic oil is then discharged from the hydraulic passage a1. As a result, hydraulic pressure is generated in the hydraulic passage a1 in association with running speed of a motorcar.

Hydraulic line pressure is introduced into the intermediate hydraulic chamber 765 via the hydraulic passage a and the hydraulic passage g thereby communicates with the hydraulic servo C-4 via the throttle 830 with a check valve fitted thereto.

Next, operation of the transfer 140 will be described below with respect to each of the preset stages.

(a) When the transfer manual valve 710 is preset to a range of H2, hydraulic pressure is released from the hydraulic passage g. Thus, no power is transmitted to the sleeve 151 whereby two wheel driving state is maintained. At this moment, hydraulic line pressure is transmitted to the hydraulic passage f, both the spool 741 and the plunger 742 of the inhibitor valve 740 are held at their lower positions as seen in the drawing and the hydraulic passage a2 communicates with a drain port 759 until hydraulic pressure is released therefrom, whereby the brake B4 and the clutch C4 are disengaged from the operative state. Further, the hydraulic passage a3 communicates with the hydraulic passage a, and moreover, with the hydraulic passage a4 via the throttle 840 with a check valve fitted thereto and the accumulator control valve 760, whereby the clutch C3 is brought in the engaged state. As a result, the transfer 140 assumes H2 (two wheel driving in the directly connected state).

(b) When the transfer manual valve 710 is preset to range H4, both the hydraulic passages f and g are supplied with hydraulic line pressure. The spool 741 and the plunger 742 of the inhibitor valve 740 are held at their lower positions as seen in the drawing under the effect of hydraulic line pressure which has been introduced into the hydraulic lines and the clutch C4 is brought in the engaged state under the effect of hydraulic line pressure which has been introduced into the hydraulic passage g. This causes the transfer 140 to assume H4 (four wheel driving in the directly connected state).

(c) When the transfer manual valve 710 is preset to a range of L4, hydraulic oil is discharged from the hydraulic passage f, whereas hydraulic line pressure is introduced into the hydraulic passage g. Thus, the clutch C4 achieves the engaged state whereby four wheel driving state is maintained. When the transfer manual valve 710 is preset to a range of L4, while running speed of a motorcar is determined to be higher than the preset level and the solenoid valve S4 is turned off, the hydraulic passage a1 is supplied with hydraulic line pressure. Thus, the spool 741 of the inhibitor valve 740 is held at the lower position thereof as seen in the drawing under the effect of hydraulic line pressure which has been introduced into the hydraulic chamber 754. This leads to no occurrence of speed changing and the engine is inhibited from overrunning.

On the other hand, when the transfer manual valve 710 is preset to a range of L4, while running speed of a motorcar is determined to be lower than the preset level and the solenoid valve S4 is turned on; or, when the transfer manual valve 710 assumes a state of L4 while running speed of the motorcar is determined to be higher than the preset level and the solenoid valve S4 is turned off, running speed is thereby decreased from the state higher than the preset level down to the state lower than the preset level. Under the conditions, the solenoid valve S4 is shifted from the turned-off state to the turned-on state and hydraulic oil is discharged from the hydraulic passage a1 whereby the spool 741 is held at the upper position thereof under the effect of resilient force of the spring 750. As a result, the hydraulic passage a communicates with the hydraulic passage a2 and the hydraulic servo B-4 is thereby supplied with working hydraulic oil. On the other hand, the hydraulic passage a3 communicates with a drain port 757 so as to allow hydraulic pressure to be released therethrough, and moreover, hydraulic pressure is released from the hydraulic servo C-3 of the clutch C3. Thus, the transfer 40 assumes a state of four wheel driving at a reduced speed. At this moment, hydraulic line pressure in the hydraulic passage a1 is transmitted to the hydraulic chamber 754 of the inhibitor valve 740, and at the same time, hydraulic line pressure is transmitted to the lower end hydraulic chamber 751 via the hydraulic oil port 743 on the sleeve-shaped land 745 of the spool 741, with the result that the spool 741 is held immovably and a state of four wheel running at a reduced speed is maintained.

The electronic control device 850 adapted to open and close the first to fourth solenoid valves S1 to S4 includes a neutral safety switch 851 for detecting the position of the speed changing stage of the shift lever in the automatic transmission 10, an OD switch 852 for shifting overdrive (OD) to underdrive (UD) and vice versa, an L4 hydraulic switch 853 for detecting when an operator makes a selection that the transfer 140 assume L4, a running speed sensor 854 for detecting running speed of a motorcar, a throttle opening sensor 855 for detecting an extent of throttle opening and a plurality of buffers 861, 862, 863, 864 and 865 electrically connected to each of the switches and sensors. Each of the buffers 861, 862, 863, 864 and 865 is adapted to input signals from the neutral safety switch 851, the OD switch 852, the L4 hydraulic switch 853, the running speed sensor 854 and the throttle opening sensor 855 into an input port 881 of the computer 880.

The digital computer 880 is designed in the manner of a microcomputer, comprising a plurality of large scale integrated circuits and is brought to the operative state on receipt of output voltage generated in response to actuation of a main switch (not shown) initiated from the power supply source on a motorcar. Specifically, the digital computer 880 includes an input port 881, a random access memory (hereinafter referred to as RAM), a read only memory (hereinafter referred to as ROM), a central processing unit (hereinafter referred to as CPU) and an output port 882, wherein the CPU is electrically connected to the RAM, the ROM, the input port 881 and the output port 882. Signals are delivered from the CPU, the RAM, the ROM and the input port 881 to the output port 882, while the ON and OFF signals are delivered to driving circuits 891, 892, 893 and 894 of the first to fourth solenoid valves S1 to S4. Driving circuits 891, 892, 893 and 894 are adapted to drive the first to fourth solenoid valves S1 to S4 in accordance with ON and OFF signals delivered to the output ports 882.

Figure 11:
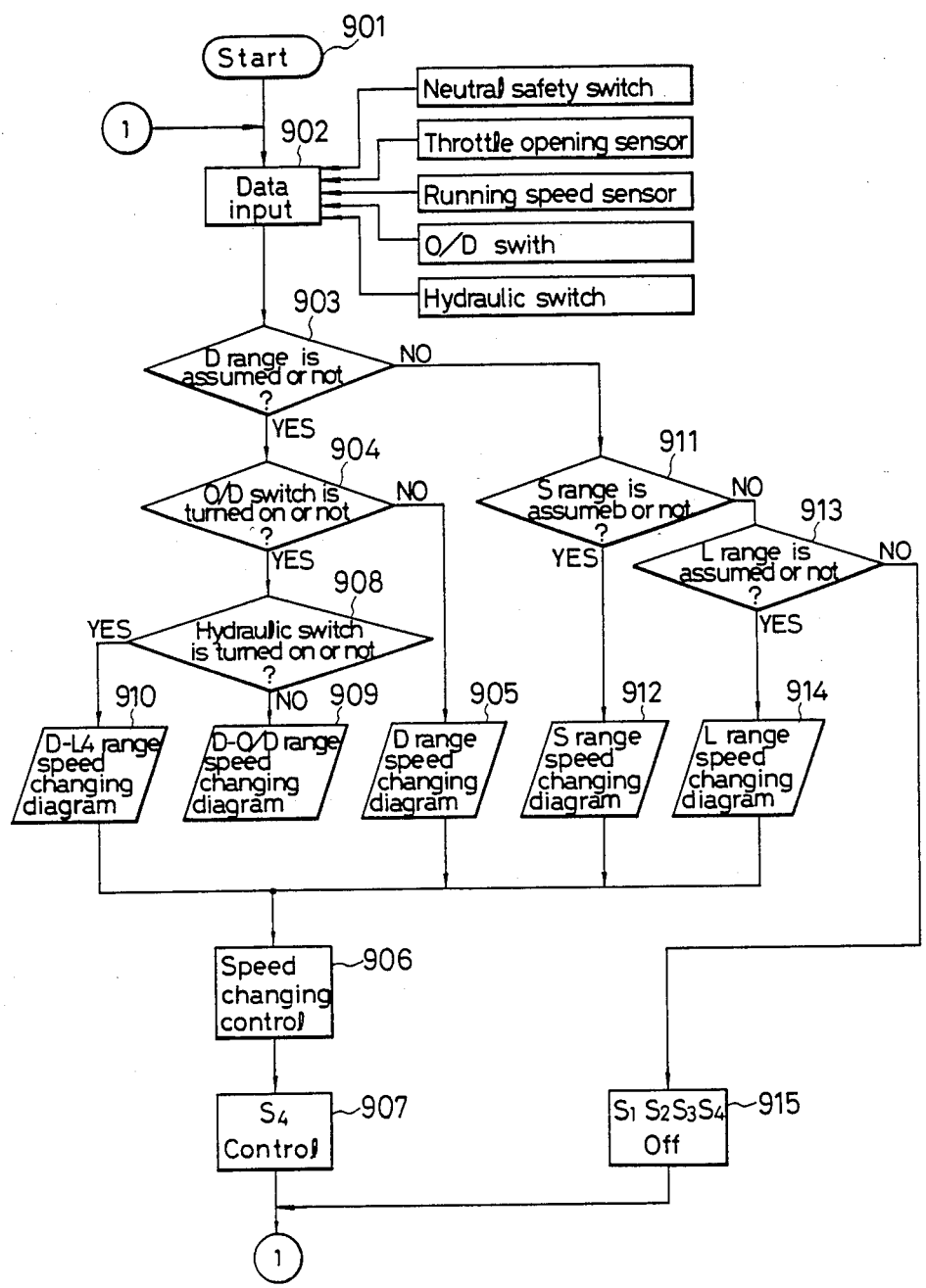
FIG. 11 is a flow chart of the four wheel driving transfer in accordance with the third embodiment of the invention.
Figure 12:
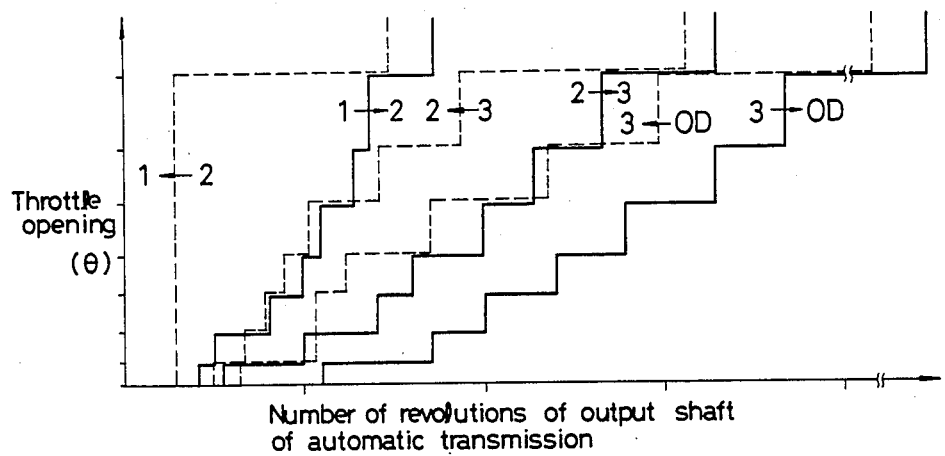
FIGS. 12 and 13 are a speed changing diagram for the four wheel driving transfer in accordance with the third embodiment of the invention.
Figure 13:
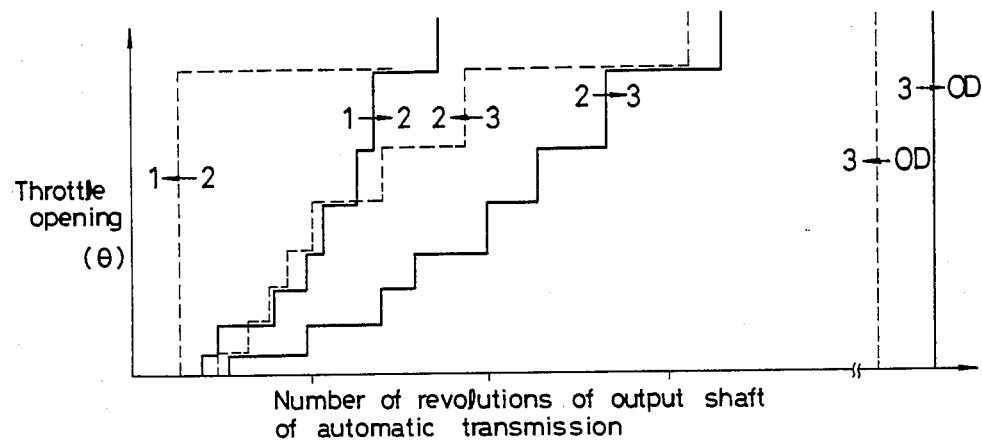

Next, operation of the automatic transmission of the invention will be described below with reference to FIG. 11, which schematically illustrates the structure thereof by way of flow chart.

First, the starter key disposed in an operator's seat is turned on by an operator to start rotation of the engine E (as identified by reference numeral 901). Shift lever position signal of the neutral safety switch 851, signal of the OD switch 852, signal of the L4 hydraulic switch 853, running speed signal generated by the running speed sensor 854 and throttle opening signal generated by the throttle opening sensor 855 are inputted in the form of data inputting (as identified by reference numeral 902). Next, a decision is made as to whether the shift lever is located at D range or not (as identified by reference numeral 903). When it is found that it is located at D range, a decision is made as to whether the OD switch 852 is turned on or not (as identified by reference numeral 904). When it is found that it is not turned on, a D range speed changing diagram is read with the aid of the ROM (as identified by reference numeral 905). Speed changing is controlled with reference to the speed changing diagram (as identified by reference numeral 906). Next, the solenoid valve S4 is controlled in the ON-OFF manner (as identified by reference numeral 907) and thereafter the operative state of the automatic transmission is returned to the initial step (as identified by reference numeral 902). When the O/D switch 852 is turned on, a decision is made as to whether the L4 hydraulic switch 853 is turned on or not (as identified by reference numeral 908). When it is found that the L4 hydraulic switch 853 is not turned on, a D-O/D range speed changing diagram (see FIG. 12) is read with the aid of the ROM (as identified by reference numeral 909) and thereafter operation proceeds to the next step (as identified by reference numeral 906). When it is found that the L4 hydraulic switch 853 is turned on, a D-L4 range speed changing diagram (see FIG. 13), which is prepared to prevent activation of the L4-O/D state (with speed changing of 3—Od and OD—3 excluded as an unpractical case) in order to inhibit an occurrence of overrunning of the engine E, is read with the aid of the ROM (as identified by reference numeral 910) and thereafter operation proceeds to the next step (as identified by reference numeral 906). When D range fails to be assumed at the step (as identified by reference numeral 903), a decision is made as to whether the shift lever is located at S range or not (as identified by reference numeral 911). When it is found that it is located at S range, an S range speed changing diagram is read with the aid of the ROM (as identified by reference numeral 912) and thereafter operation proceeds to the next step (as identified by reference numeral 906). When it is found that S range fails to be assumed, a decision is made as to whether the shift lever is located at L range or not (as identified by reference numeral 913). When L range is assumed, an L range speed changing diagram is read with the aid of the ROM (as identified by reference numeral 914) and thereafter proceeds to the next step (as identified by reference numeral 906). When it is found that L range fails to be assumed, all of the solenoid valves S1 to S4 are shifted to the OFF state (as identified by reference numeral 915) and thereafter operation resumes to the next step (as identified by reference numeral 902).

Figure 14:
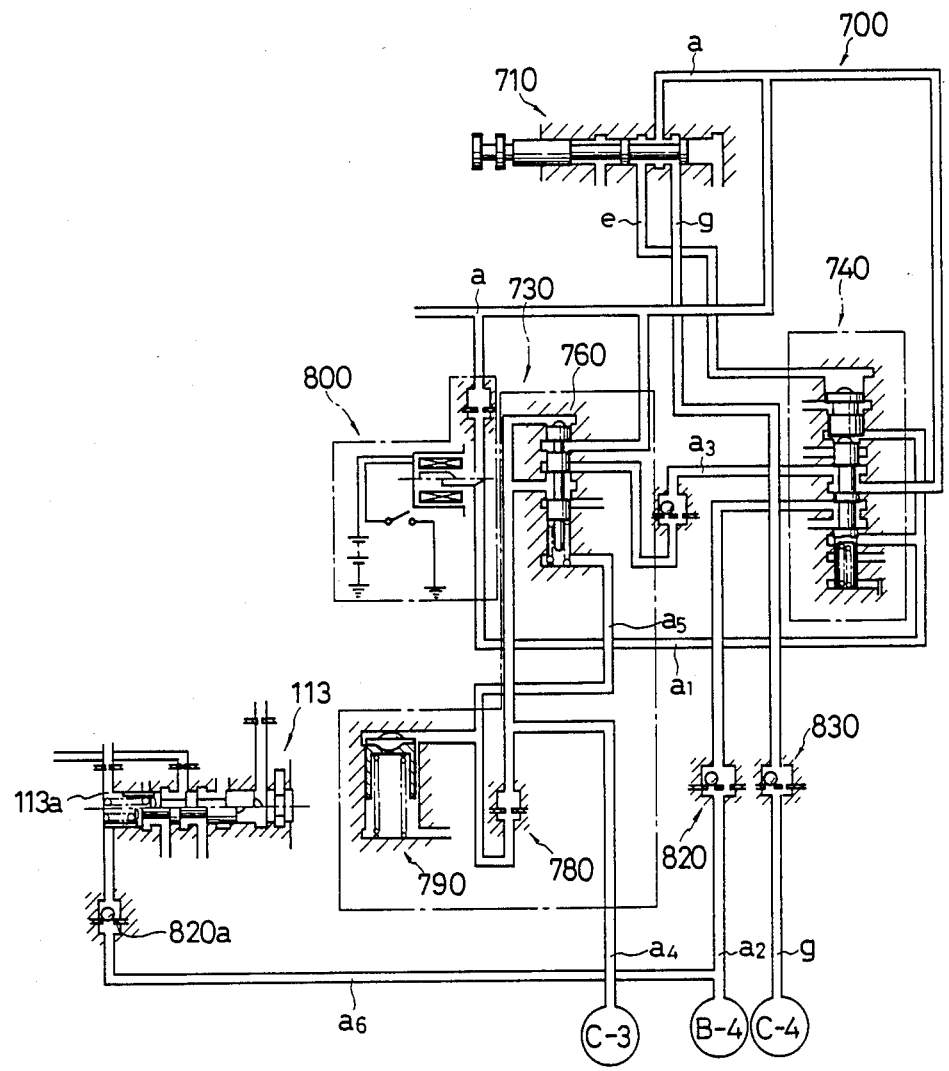
FIG. 14 is a hydraulic circuit diagram of the hydraulic control device for the four wheel driving transfer in accordance with the fourth embodiment of the invention.

Finally, FIG. 14 schematically illustrates an automatic transmission in accordance with the fourth embodiment of the invention.

In this embodiment, the hydraulic circuit is so constructed that the left end hydraulic chamber 113a of the 3-4 shift valve 113 as illustrated in the drawing of the third embodiment hydraulically communicates with the hydraulic servo B-4 via a hydraulic passage a6 including a throttle 820a with a check valve fitted thereto. When the hydraulic servo B-4 is supplied with pressurized hydraulic oil and the transfer 140 thereby assumes a speed changing stage of L4, the left end hydraulic chamber 113a of the 3-4 shift valve 113 is supplied with pressurized hydraulic oil, whereby the spool is held at the righthand position thereof as seen in the drawing. As a result, speed changing to overdrive is inhibited from occurring.

As will be readily understood from the above description, the automatic transmission of the invention has an advantageous feature in that any occurrance of a malfunctioning such as abnormal increase in temperature of working hydraulic oil due to excessive slippage of the torque converter in the automatic transmission 10, which is attributable to shifting to the overdrive stage during running of a motorcar on the ground having high resistance against running, for instance, sandy ground or the like area, while maintaining the four wheel driving state, can be inhibited effectively, since speed changing of the main transmission 10 to H4 is inhibited while the transfer 40 assumes L4.

While the present invention has been described above with respect to a few preferred embodiments thereof, it should of course be understood that the invention should not be limited only to those embodiments. Various changes or modifications may be made in any acceptable manner without departure from the spirit and scope of the invention.

What is claimed is:

1. An automatic transmission for motor vehicles and the like, comprising:
    a main transmission having a plurality of speed ranges and means for shifting therebetween;
    an auxiliary transmission with at least one lower speed range; and,
    means for inhibiting upshifting in the main transmission to higher speed ranges when the auxiliary transmission operates in the at least one lower speed range.

2. An automatic transmission as claimed in claim 1, further comprising:
    an electromagnetically operated solenoid valve in the main transmission which enables speed changing to the highest speed ratio in the main transmission when it is turned on; and,
    an hydraulic control device for the auxiliary transmission which includes a speed reduction hydraulic passage which communicates with an hydraulic servo for a speed reduction frictional engagement element which allows the auxiliary transmission to assume the low speed, high power range, the solenoid valve being disposed midway of the speed reduction hydraulic passage and being electrically connected to a pressure switch which is turned off when the hydraulic servo is supplied with pressurized hydraulic oil and is turned on when hydraulic pressure is released therefrom, whereby when the auxiliary transmission assumes the low speed, high power range, the hydraulic servo is supplied with pressurized hydraulic oil, the solenoid valve is turned off and speed changing to the highest speed ratio in the main transmission is inhibited.

3. An automatic transmission as claimed in claim 1, further comprising:
an electromagnetically operated solenoid valve in the main transmission which enables speed changing to the highest speed ratio in the main transmission; and,
a first solenoid valve in the auxiliary transmission which is turned off when the auxiliary transmission assumes the low speed, high power range, the solenoid valve in the main transmission and the first solenoid valve in the auxiliary transmission being electrically connected in an electric circuit such that the solenoid valve in the main transmission is turned off when the first solenoid valve in the auxiliary transmission is turned off, whereby any speed changing to the highest speed ratio in the main transmission is inhibited.

4. An automatic transmission as claimed in claim 1, further comprising a control device operative to inhibit shifting to a certain higher speed range in the main transmission in accordance with at least one predetermined control signal generated by a control signal storage unit responsive to a signal outputted when the lower speed range of the auxiliary transmission is selected.

5. An automatic transmission as claimed in claim 1, further comprising:
a shift valve disposed midway in an hydraulic circuit for the main transmission, the shift valve being adapted to enable speed changing to the highest speed ratio; and,
an hydraulic control device in the auxiliary transmission which includes a speed reduction hydraulic passage which communicates with a speed reduction frictional engagement element adapted to allow the auxiliary transmission to assume the low speed, high power range, the shift valve being located on the operative side, whereby any speed changing to the highest speed ratio in the main transmission is inhibited.

6. An automatic transmission as claimed in claim 1, wherein the upshift inhibiting means comprises:
control means for preventing normal operation of the shifting means in the main transmission;
means for receiving input signals corresponding to manually selected positions of control devices for the automatic transmission; and,
means for generating control signals for operating the control means responsive to the input signals.

7. An automatic transmission as claimed in claim 6, wherein the means for generating the control signals comprises:
means for storing selectable control signals;
means for selecting one of the control signals responsive to the input signals; and,
means for transmitting the selected signals to the control means.

8. An automatic transmission as claimed in claim 6, wherein the control means comprises valve means for controlling passage of operating fluid in the main transmission.

9. An automatic transmission as claimed in claim 6, wherein the control means comprises digital signal processing means.

10. An automatic transmission as claimed in claim 1, wherein the upshift inhibiting means comprises:
control means for preventing normal operation of the shifting means in the main transmission;
first digital processing means for receiving input signals corresponding to manually selected positions of control devices for the automatic transmission and corresponding to operating parameters of the motor vehicles; and,
second digital processing means for generating control signals for operating the control means responsive to the input signals.

11. An automatic transmission as claimed in claim 10, wherein the second digital processing means for generating the control signals comprises;
third digital processing means for storing selectable control signals;
fourth digital processing means for selecting one of the control signals responsive to the input signals; and,
means for transmitting the selected signals to the control means.

12. An automatic transmission as claimed in claim 11, wherein the third digital processing means comprises a read-only-memory having a plurality of selectable control signals stored therein.

13. An automatic transmission as claimed in claim 1, wherein the upshift inhibiting means comprise:
control means for preventing normal operation of the shifting means in the main transmission;
means for receiving input signals corresponding to manually selected positions of control devices for the automatic transmission and corresponding to operating parameters of the motor vehicles; and,
means for generating control signals for operating the control means responsive to the input signals.

14. An automatic transmission as claimed in claim 13, wherein the main transmission comprises a plurality of electrically operable valves, each valve being operatively associated with one of a plurality of means for upshifting between functionally adjacent speed ranges and each valve being connected to prevent upshifting in response to one of the control signals.

15. An automatic transmission as claimed in claim 14, wherein the means for generating the control signals comprises:
means for storing selectable sets of control signals, each set of control signals containing command information for each of the valves;
means for selecting one of the sets of control signals responsive to the input signals; and,
means for transmitting the control signals in the selected set to the respective valves.

16. An automatic transmission as claimed in claim 15, wherein the control means comprises digital signal processing means.

* * * * *

UNITED STATES PATENT AND TRADEMARK OFFICE
CERTIFICATE OF CORRECTION

PATENT NO. : 4,726,262
DATED : Feb. 23, 1988
INVENTOR(S) : Hayakawa et al.

It is certified that error appears in the above-identified patent and that said Letters Patent is hereby corrected as shown below:

In the Assignee Information on the cover page, after "Aisin Warner Limited, Japan", insert --; Toyota Jidosha Kabushiki Kaisha, Japan, co-owners--.

The Abstract should read as follows:--

An automatic transmission with overdrive inhibitor for motor vehicles and the like, comprising: a main transmission selectively establishing a plurality of successive speed ranges, the main transmission having a shift controller for shifting therebetween, the speed ranges having a highest speed range with an overdrive gear ratio; an auxiliary transmission with at least one low speed, high power range and at least one high speed range; and, a shift inhibitor in the main transmission to prevent upshifting of the main transmission to the highest speed range when the auxiliary transmission operates in the at least one low speed, high power range, whereby overdrive may not be engaged during low speed, high power operation.--

In the Specification:

Column 8, line 25, after "chamber", delete "242" and insert --252--.

UNITED STATES PATENT AND TRADEMARK OFFICE
CERTIFICATE OF CORRECTION

PATENT NO. : 4,726,262

DATED : Feb. 23, 1988

INVENTOR(S) : Hayakawa et al.

It is certified that error appears in the above-identified patent and that said Letters Patent is hereby corrected as shown below:

Column 8, line 34, "intermediae" should be --intermediate--.

Column 9, line 49, "(mixing" should be --(making--.

Column 10, line 17 should read --letter "C" designates the operative state of speed--.

Column 17, line 39, "C4", first occurrence, should be --C-4--.

Column 23, line 62, after "thereafter" insert --operation--.

Signed and Sealed this

Fourth Day of October, 1988

Attest:

DONALD J. QUIGG

*Attesting Officer*   *Commissioner of Patents and Trademarks*